(12) United States Patent
Maeda et al.

(10) Patent No.: US 7,394,951 B2
(45) Date of Patent: Jul. 1, 2008

(54) OPTICAL SIGNAL LEVEL CONTROL APPARATUS

(75) Inventors: Takuji Maeda, Kawasaki (JP); Hiroaki Tomofuji, Kawasaki (JP); Yuji Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 10/436,076

(22) Filed: May 13, 2003

(65) Prior Publication Data

US 2003/0223728 A1    Dec. 4, 2003

(30) Foreign Application Priority Data

May 30, 2002    (JP)    ............... 2002-157755

(51) Int. Cl.
*G02B 6/12*    (2006.01)
(52) U.S. Cl. .................. 385/14; 385/5; 385/1; 398/198
(58) Field of Classification Search .................... 385/15, 385/140, 14; 398/198
See application file for complete search history.

(56) References Cited

U.S. PATENT DOCUMENTS

| | | | |
|---|---|---|---|
| 5,680,246 A | 10/1997 | Takahashi et al. | |
| 5,798,853 A * | 8/1998 | Watanabe | .................... 398/150 |
| 6,304,586 B1 * | 10/2001 | Pease et al. | ............... 372/38.02 |
| 6,320,694 B1 * | 11/2001 | Ohshima | ............... 359/341.33 |
| 6,333,805 B1 | 12/2001 | Kamata | |
| 6,646,791 B2 * | 11/2003 | Sugaya et al. | .......... 359/341.41 |
| 6,795,653 B1 * | 9/2004 | King | ........................... 398/81 |
| 2001/0017729 A1 * | 8/2001 | Sugaya et al. | .......... 359/341.41 |
| 2002/0067538 A1 * | 6/2002 | Sugaya et al. | .......... 359/337.12 |
| 2002/0186460 A1 * | 12/2002 | Lelic | ........................ 359/341.4 |
| 2003/0099475 A1 | 5/2003 | Nemoto et al. | |
| 2003/0128417 A1 * | 7/2003 | Kawanishi et al. | .......... 359/279 |
| 2003/0175037 A1 * | 9/2003 | Kimmitt et al. | ............. 398/198 |
| 2003/0202727 A1 * | 10/2003 | Olesen | .......................... 385/1 |
| 2004/0126120 A1 * | 7/2004 | Cohen et al. | ................. 398/158 |

FOREIGN PATENT DOCUMENTS

| | | |
|---|---|---|
| JP | 8-37497 | 2/1996 |
| JP | 8-37499 | 2/1996 |
| JP | 2000-332691 | 11/2000 |
| JP | 2003-163641 | 6/2003 |
| WO | WO0223770 A1 | 3/2002 |

* cited by examiner

*Primary Examiner*—Frank G Font
*Assistant Examiner*—Eric Wong
(74) *Attorney, Agent, or Firm*—Staas & Halsey LLP

(57) ABSTRACT

In an optical signal level control apparatus used in a WDM system, the amount of circuitry per wavelength is reduced. Optical power level is detected on the output side of a variable optical attenuator, and the amount of attenuation in the variable optical attenuator is adjusted so that the output level becomes equal to a constant value L1. At this time, if the detected level is lower than a threshold value Th0 or Th-d, it is determined that a signal off condition has occurred, and the amount of attenuation is set to a constant value A1. The amount of attenuation, A1, is chosen to be sufficiently larger than the amount of attenuation used in the output level constant control but small enough to be able to detect the restoration of the signal. When the amount of attenuation is being held at the constant value A1, if the output level is restored to a level higher than the threshold value Th0 or Th1 (Th1< Th-d), the output constant control is resumed.

47 Claims, 21 Drawing Sheets

OPTICAL SIGNAL LEVEL CONTROL APPARATUS

BACKGROUND OF THE INVENTION

1. Field of the Invention

With growing numbers of Internet, mobile telephone, and other network users, network traffic has been increasing, and this, coupled with ever diversifying services from electronic commerce and electronic mail to delivery of moving images, has been increasing capacity needs. To meet such needs, large-capacity networks are indispensable, and the introduction of optical communication networks has been increasing; in particular, wavelength division multiplexing communication networks using wavelength division multiplexing (WDM) technology have been deployed rapidly. In WDM, transmission quality degrades if there occurs a variation in optical power level between wavelength multiplexed optical signals due to variation in characteristics among optical components such as optical fibers, optical amplifiers, etc. In particular, when an optical node (OADM, OXC, etc.) constructed by combining various optical components is used, the variation increases, and it becomes necessary to provide an optical level adjusting function. The present invention relates to an optical level control method, and an apparatus, that have a function to suppress such variation, and that autonomously perform control so as to prevent the occurrence of an optical surge and like phenomenon in the event of a failure or during protection.

2. Description of the Related Art

FIG. 1 shows one example of prior art optical signal level control in a WDM system. A wavelength multiplexed input signal ($\lambda_1$ to $\lambda_n$) is separated into signals of different wavelengths by an optical splitter 10, and the separated signals are each passed through an optical branching device 12, a variable optical attenuator 14, and an optical branching device 16, and are again wavelength multiplexed by an optical combiner 18 and amplified by an optical amplifier 20.

A photodetector 22 detects the power of light separated by the optical branching device 16 provided on the output side of the variable optical attenuator 14, and feedback-controls the variable optical attenuator 14 through a control circuit 24 to maintain the power level of the light of the corresponding wavelength at a constant level. On the other hand, a photodetector 26 is provided to detect whether the optical signal of the corresponding wavelength has been input normally and also to detect a signal off condition.

As described above, as the prior art optical signal level control requires the provision of two photodetectors for each wavelength, one for feedback control and the other for the detection of a signal off condition, the prior art has had the problem that the amount of circuitry, and the overall cost of the apparatus increase as the number of wavelengths increases.

SUMMARY OF THE INVENTION

It is accordingly an object of the present invention to achieve both the optical power level constant control and the signal off detection control while reducing the amount of circuitry and the overall cost.

According to the present invention, there is provided an optical signal level control apparatus comprising: a variable optical attenuator; a photodetector for detecting optical power level at an output of the variable optical attenuator; and a control circuit for controlling the amount of attenuation in the variable optical attenuator in accordance with the detected optical power level, and wherein the control circuit includes: means for controlling the amount of attenuation in the variable optical attenuator so that the detected optical power level becomes equal to a target value; and means for maintaining the amount of attenuation in the variable optical attenuator at a predetermined value when the detected optical power level has dropped below a first threshold value, the predetermined value being chosen to be small enough to be able to detect restoration of the optical power level.

According to the present invention, there is also provided an optical signal level control apparatus comprising; a variable optical attenuator; a photodetector for detecting optical power level at an input of the variable optical attenuator; and a control circuit for controlling the amount of attenuation in the variable optical attenuator in accordance with the detected optical power level, and wherein the control circuit includes: means for storing the relationship between the optical power level at the input of the variable optical attenuator and a setting for the variable optical attenuator for bringing the optical power level at an output of the variable optical attenuator to a target value; means for controlling the optical power level at the output of the variable optical attenuator to the target value by setting the amount of attenuation in the variable optical attenuator based on the detected optical power level and the stored relationship; and means for maintaining the amount of attenuation in the variable optical attenuator at a predetermined value when the detected optical power level has dropped below a first threshold value.

DESCRIPTION OF THE PREFERRED EMBODIMENTS

Figure 1:
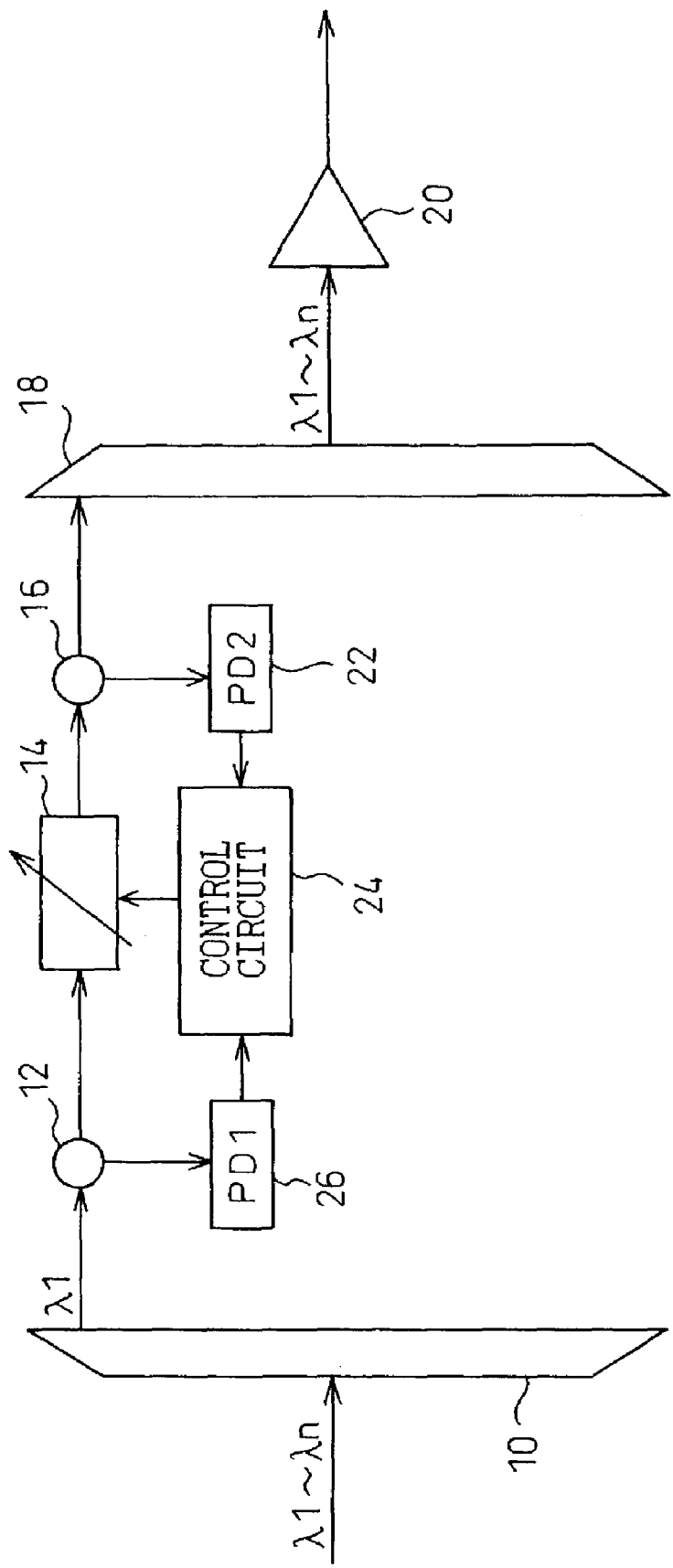
FIG. 1 is a diagram showing one example of prior art optical signal level control in a WDM system.
Figure 2:
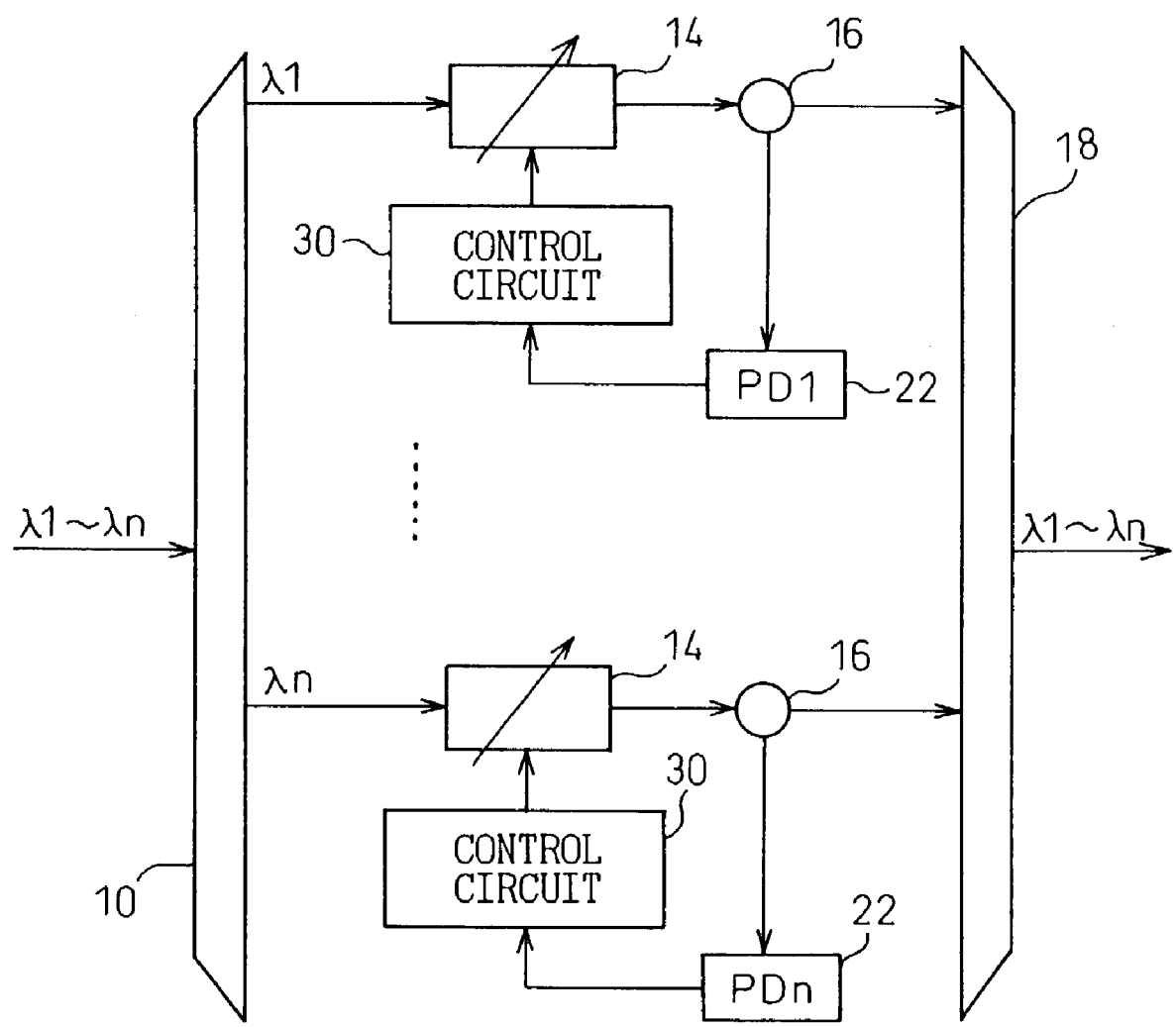
FIG. 2 is a diagram showing a first embodiment of the present invention.

FIG. 2 is a diagram showing one embodiment of the present invention. The same constituent elements as those in FIG. 1 are designated by the same reference numerals, and the description of those elements will be omitted here.

Figure 3:
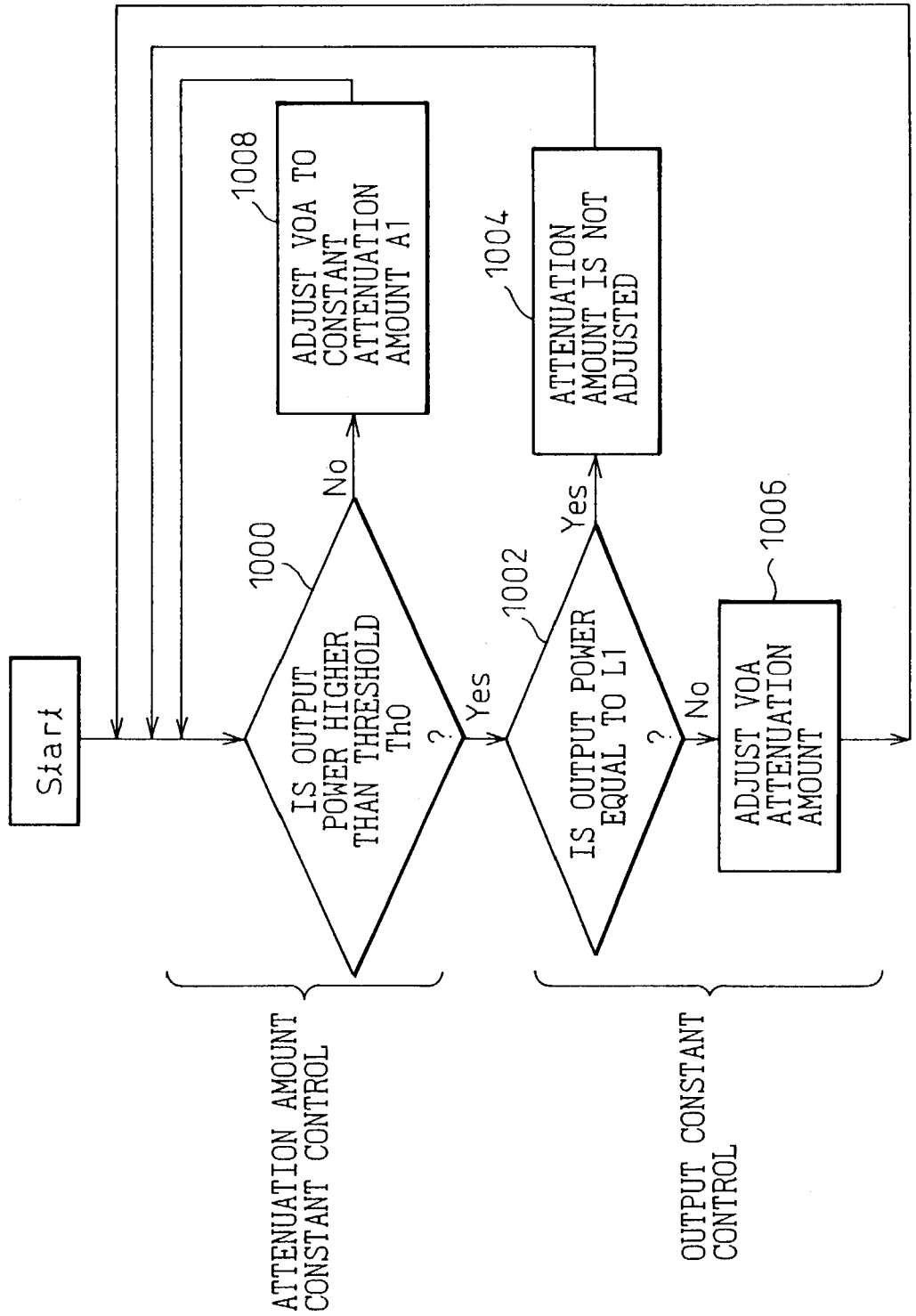
FIG. 3 is a flowchart showing a first example of control performed in a control circuit 30.

In the embodiment of FIG. 2, the control circuit 30 provided for each wavelength achieves both the optical power level constant control and the detection and control of a signal off condition and restoration from the signal off condition, based only on the result of the detection done on the output of the variable optical attenuator 14 by the optical branching device 16 and the photodetector 22 provided on the output side of the variable optical attenuator 14. As shown in the flowchart of FIG. 3, first the optical power level detected on the output side of the variable optical attenuator 14 by the photodetector 22 is compared with a threshold value Th0 (step 1000), and the output constant control is performed if the optical power level (output power) on the output side is higher than the threshold value Th0. In the output constant control, if the output power is substantially equal to the target level L1 (step 1002), the amount of attenuation in the variable optical attenuator 14 is not adjusted (step 1004), but if the output power is not equal to the target level L1, the amount of attenuation is adjusted so that the output power becomes equal to the target level (step 1006).

If the output power is lower than the threshold value Th0, control is performed to maintain the attenuation amount constant (step 1008). In the attenuation amount constant control, the amount of attenuation in the variable optical attenuator 14 is controlled to a constant level A1. The amount of attenuation, A1, is chosen to be small enough that the signal restored to the normal state can be detected with the threshold value Th0, but preferably, it is sufficiently larger than the amount of attenuation used in the output constant control. With this setting, by detecting only the output of the variable optical attenuator, the output power can be controlled at a constant level during normal operation; on the other hand, when a signal off condition is detected, the amount of attenuation is maintained at the predetermined value, so that an abnormal value can be prevented from being output when the signal is restored from the off condition to the normal condition. The control circuit 30 for performing such operation can be implemented by a CPU and a storage device for storing a program for the same, but it can also be implemented by logic circuits only.

Figure 4:
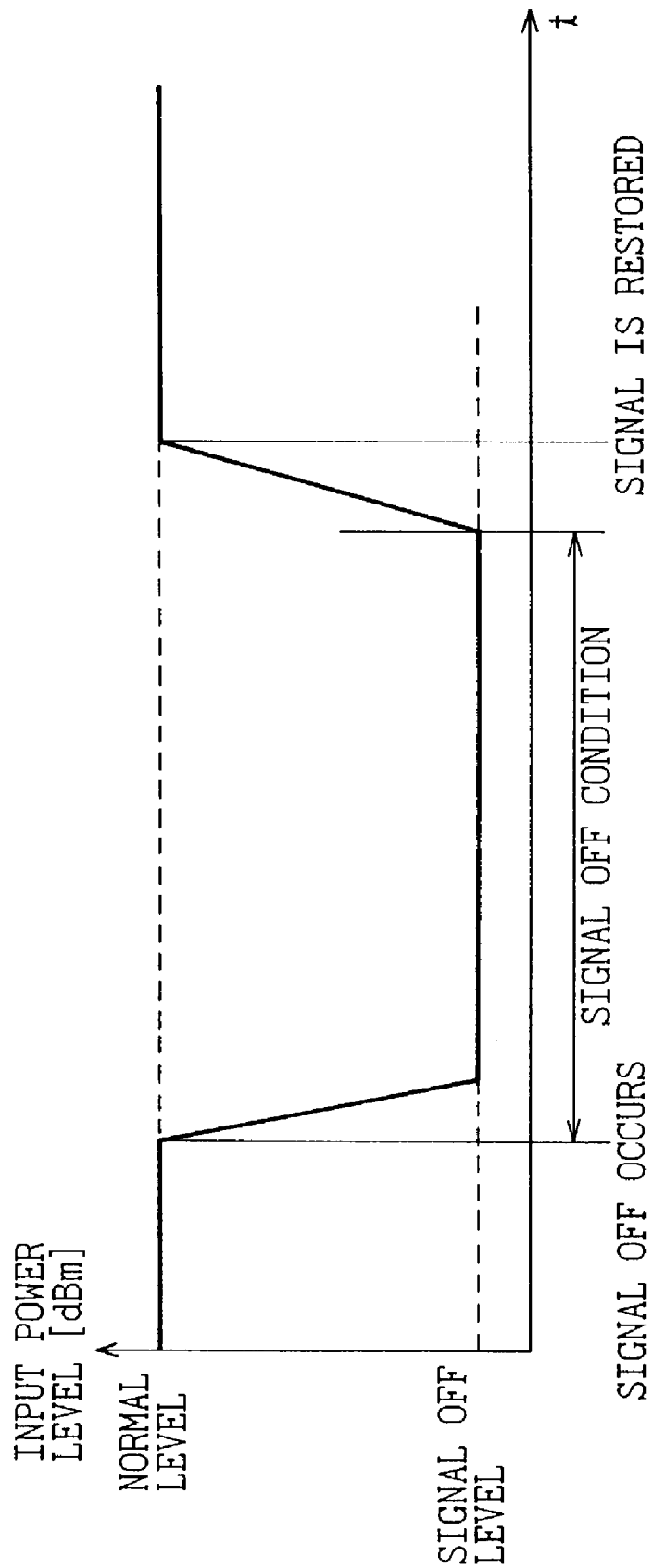
FIG. 4 is a diagram showing transitions of input power level.
Figure 5:
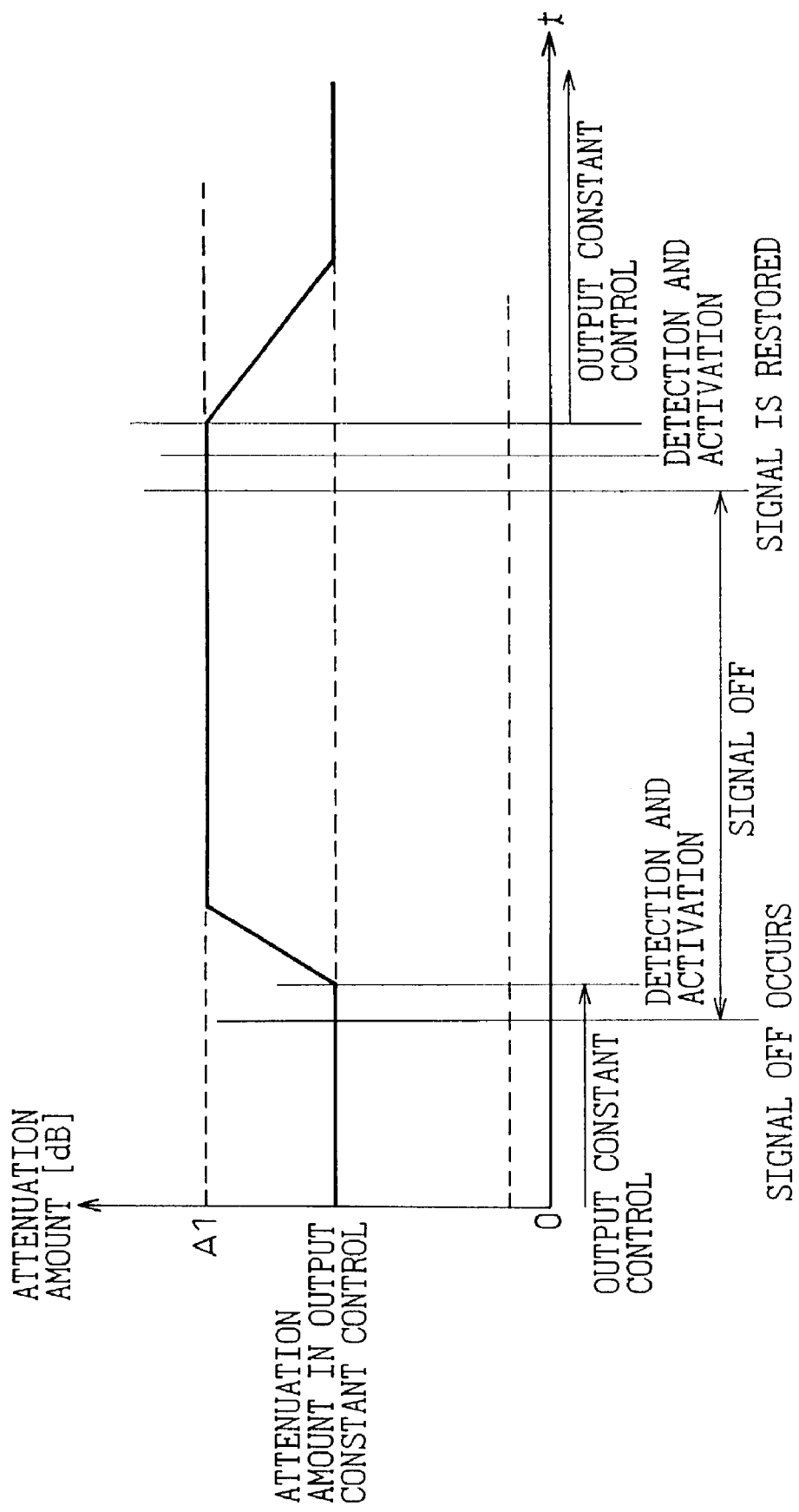
FIG. 5 is a diagram showing transitions of attenuation amount in the first example of control.
Figure 6:
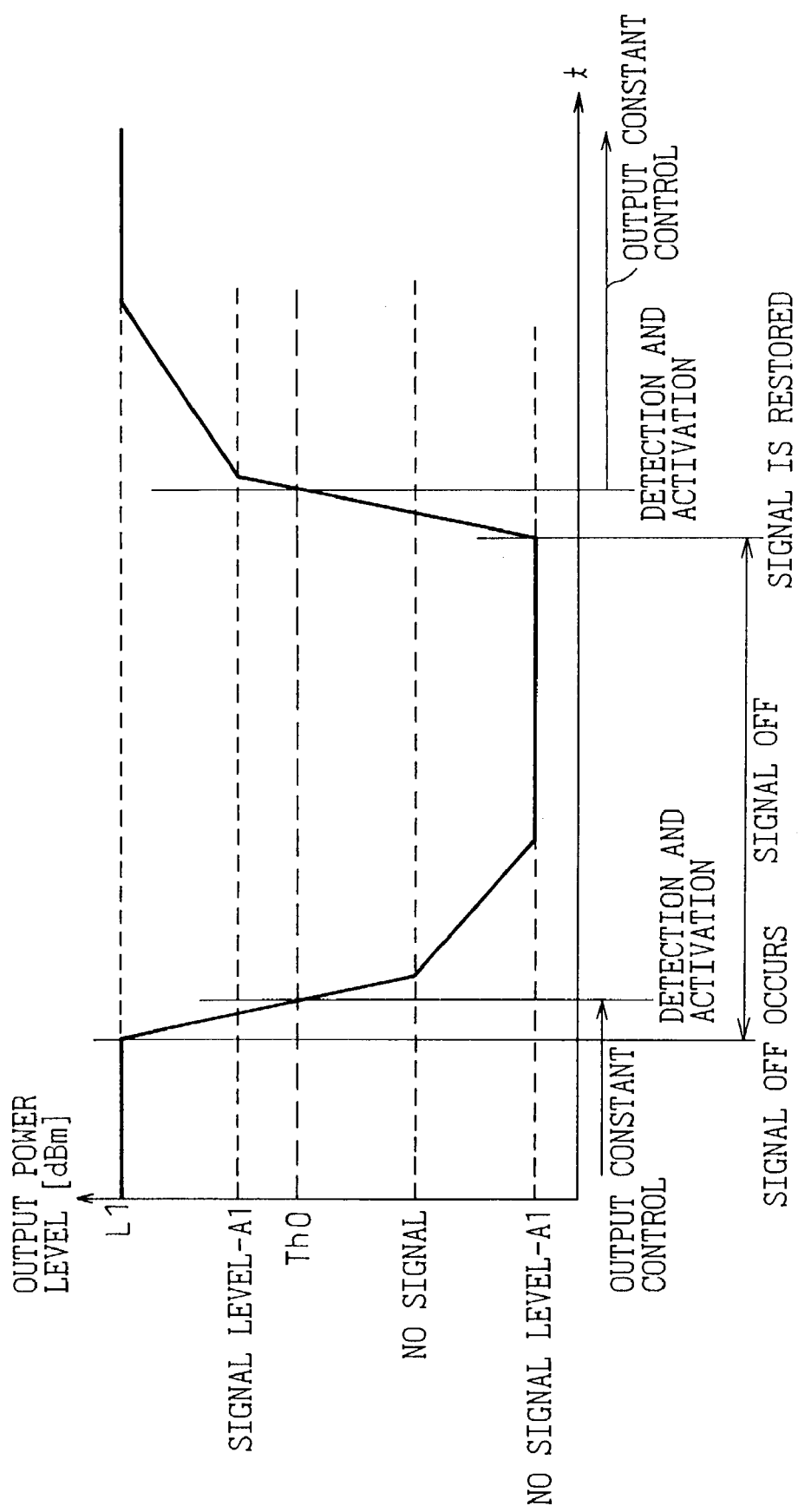
FIG. 6 is a diagram showing transitions of output power level in the first example of control.

FIGS. 4, 5, and 6 are diagrams showing the transitions of the optical power level (input power level) on the input side of the variable optical attenuator, the amount of attenuation in the variable optical attenuator, and the optical power level (output power level) on the output side, respectively, for the case where a signal off condition occurs and the signal is restored thereafter. When a signal off condition occurs, and the input power level drops from the normal level to the signal off input power level as shown in FIG. 4, the output power level drops from the output constant control level L1 to the no-signal level as shown in FIG. 6; when this level drop is detected with the threshold value Th0, the amount of attenuation is changed from the amount of attenuation used in the output constant control to a larger attenuation amount, i.e., A1, as shown in FIG. 5. Thereupon, the output power level further drops by A1-(attenuation in constant control), achieving a substantially shut-off condition (FIG. 6). When the signal is restored from the signal off condition (FIG. 4), as the threshold value Th0 is set lower than a level lower than the signal level by A1 (signal level-A1), the signal restoration is detected with the threshold value Th0 and the output constant control is thus resumed.

Figure 7:
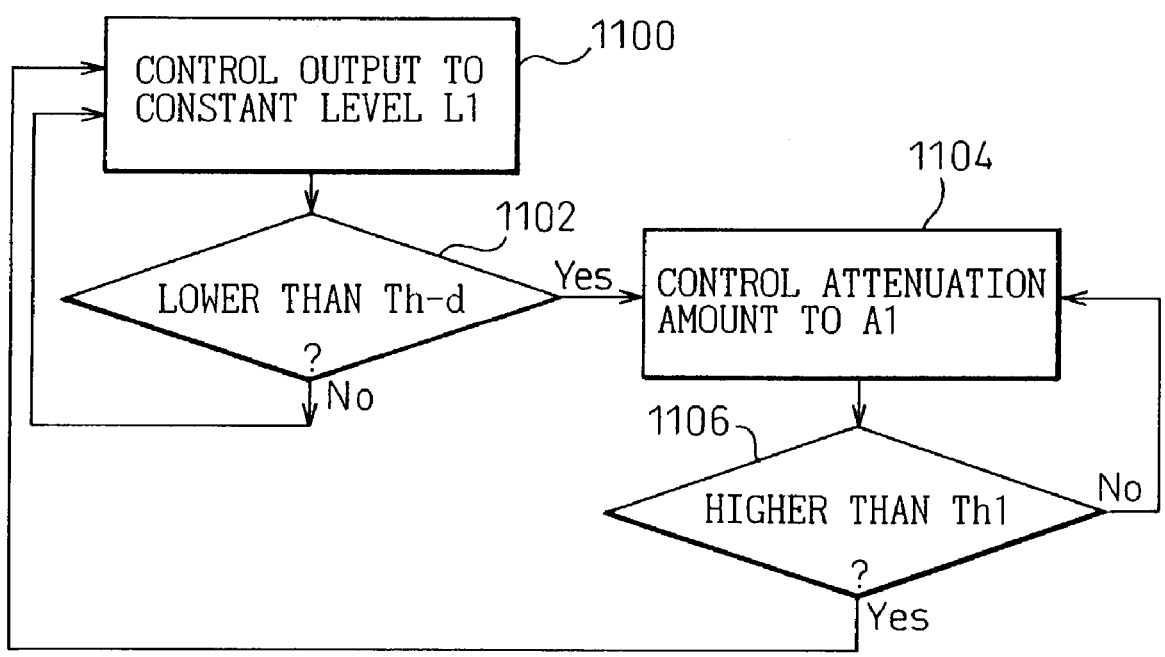
FIG. 7 is a flowchart showing a second example of control performed in the control circuit 30.
Figure 8:
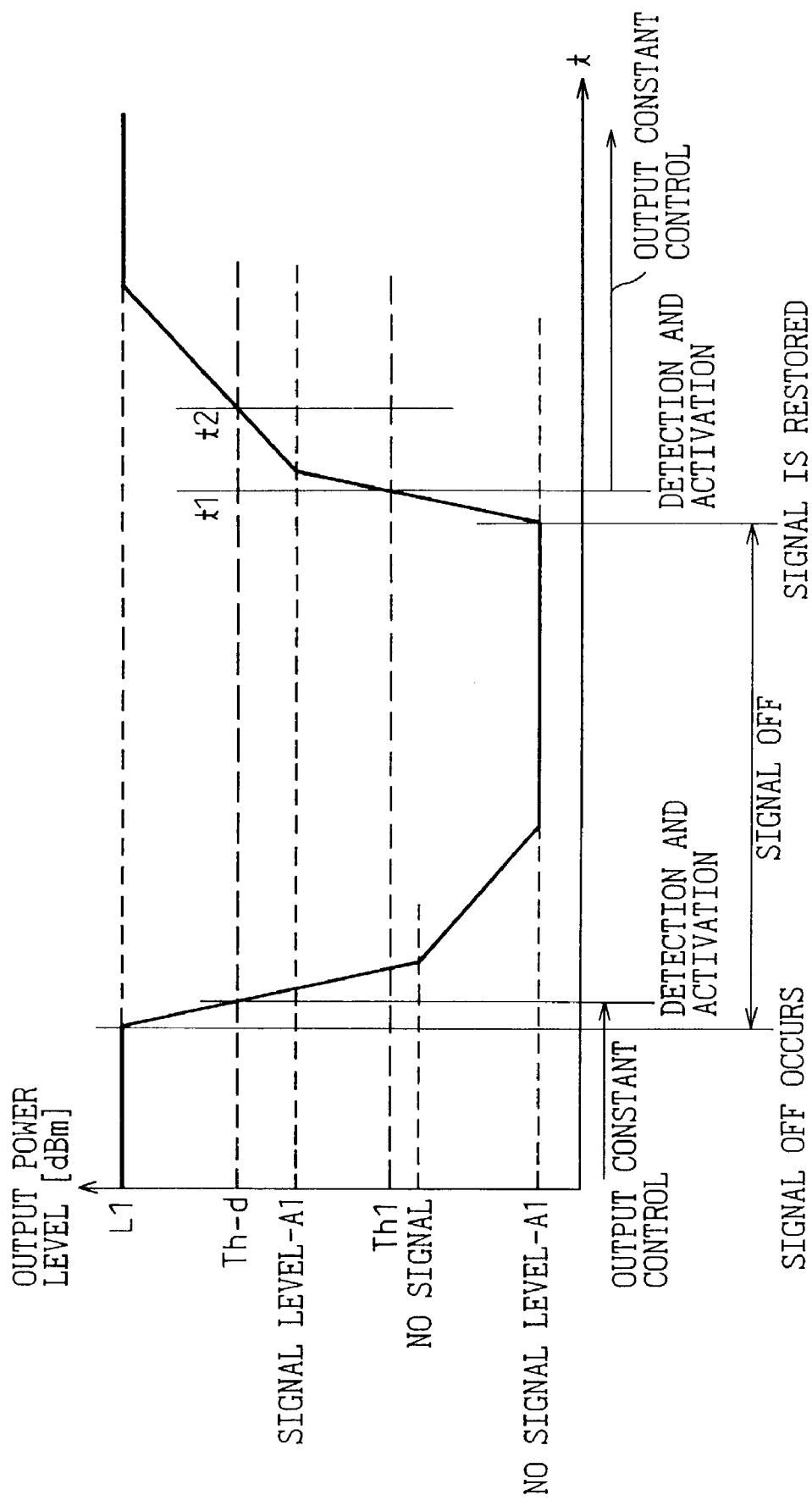
FIG. 8 is a diagram showing transitions of output power level in the second example of control.
Figure 9:
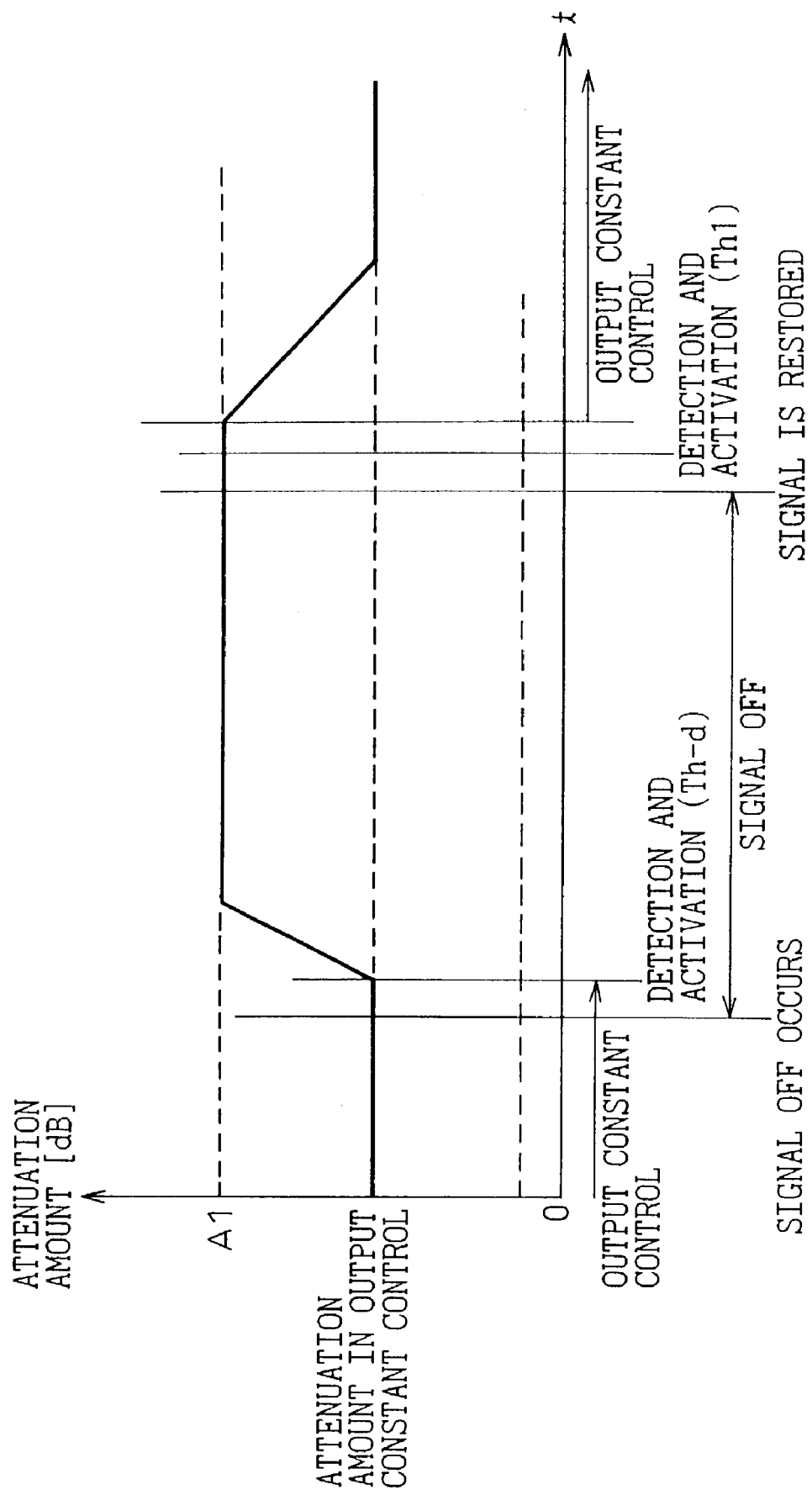
FIG. 9 is a diagram showing transitions of attenuation amount in the second example of control.

FIG. 7 is a flowchart showing a second example of the control performed in the control circuit 30. In FIG. 7, if the output level drops below threshold value Th-d during the output constant control (step 1100), the control is switched to the attenuation amount constant control using the attenuation amount A1 (step 1104). If the output level is restored to a level higher than threshold value Th1 during the attenuation amount constant control (step 1106), the control is switched back to the output constant control. The transitions of the output level and the attenuation amount in the above process are shown in FIGS. 8 and 9, respectively. As shown in FIG. 8, the threshold value Th-d is set to a value different from the threshold value Th1, and preferably larger than Th1. By so setting, the signal restoration can be detected with Th1 even when the amount of attenuation, A1, to be used in the attenuation amount constant control is increased.

Figure 10:
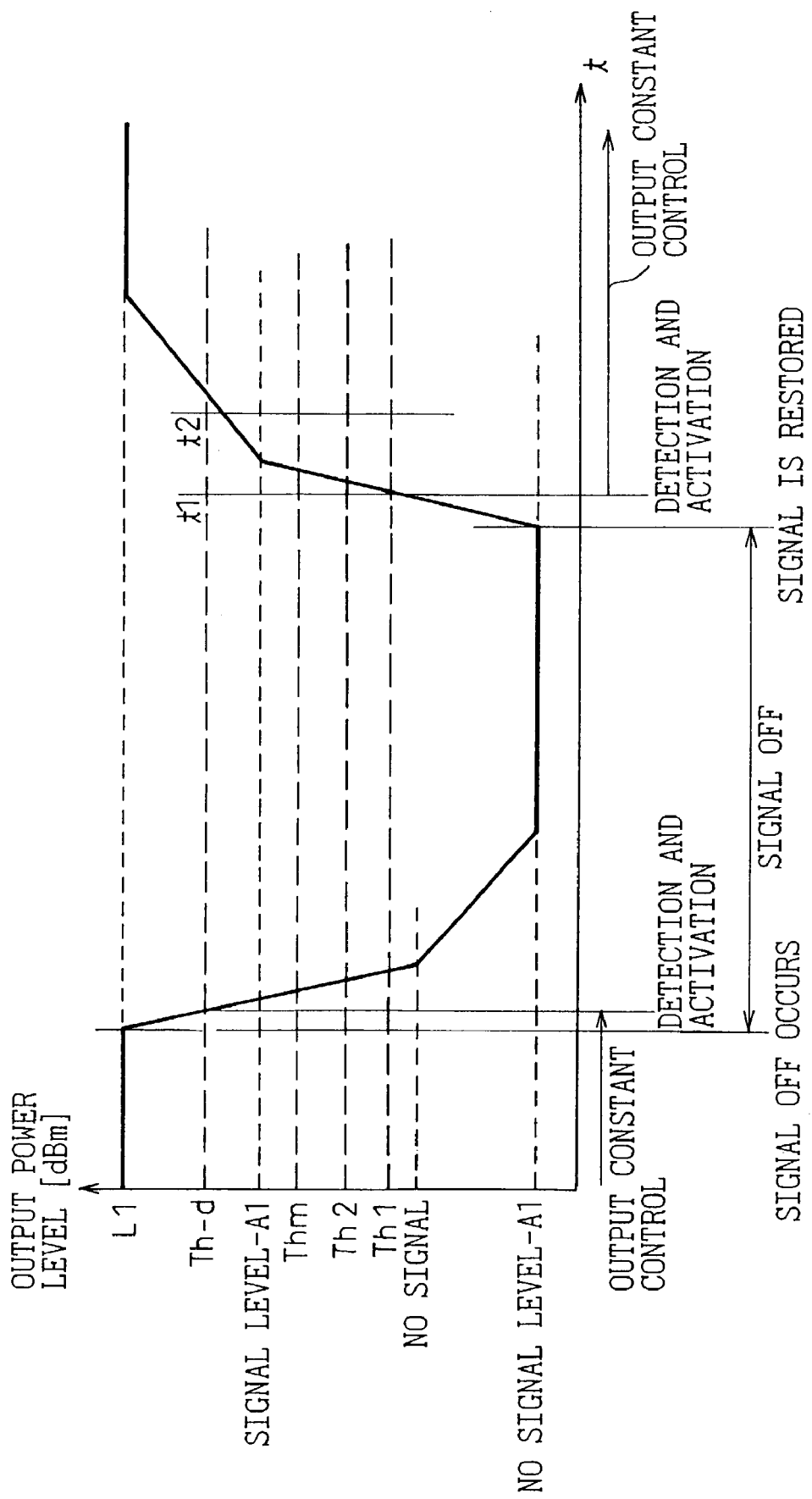
FIG. 10 is a diagram showing transitions of output power level in a third example of control.
Figure 11:
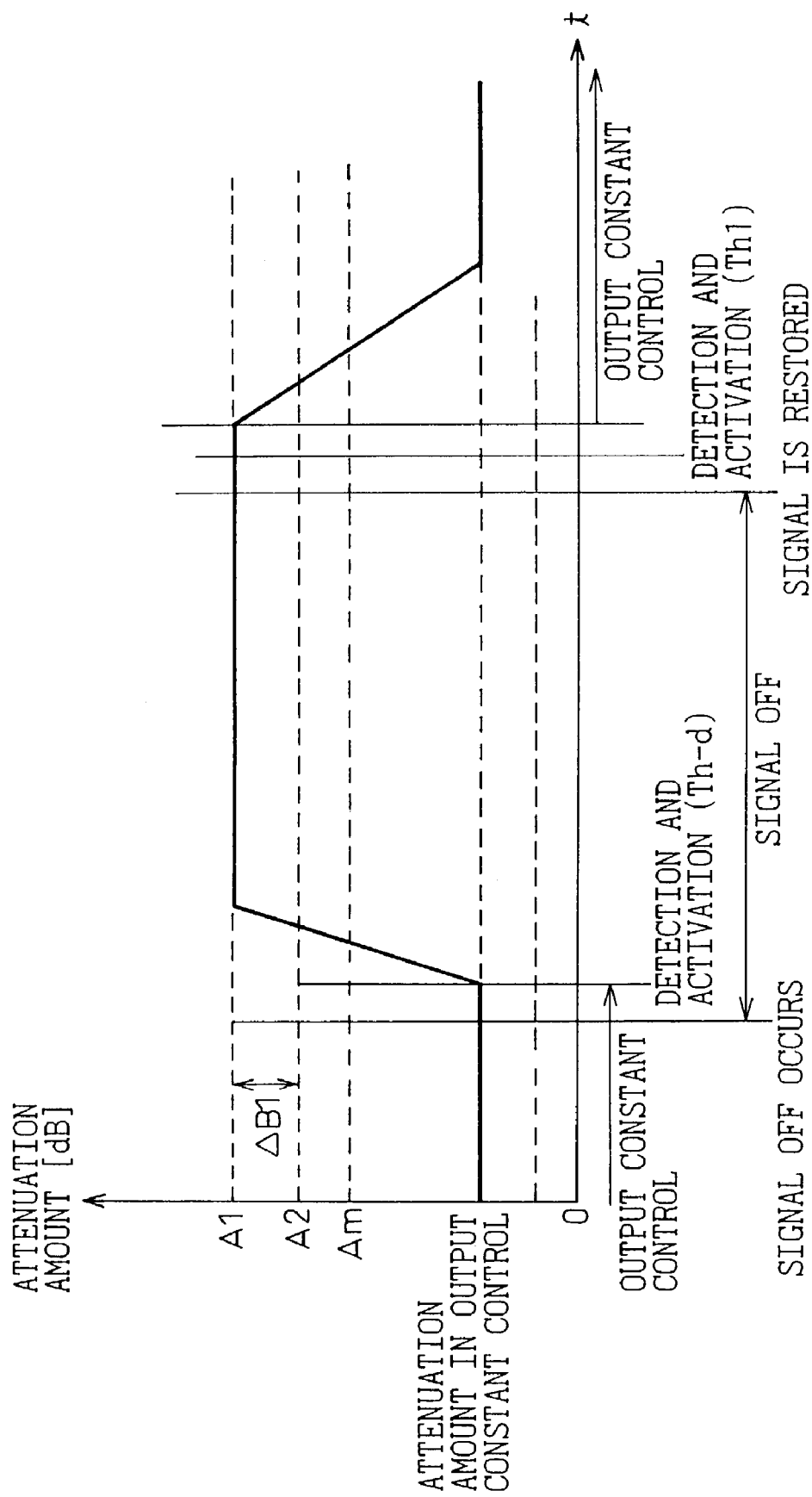
FIG. 11 is a diagram showing transitions of attenuation amount in the third example of control.

FIGS. 10 and 11 show the transitions of the output power level and the attenuation amount, respectively, in a third example of the control performed in the control circuit 30.

Figure 12:
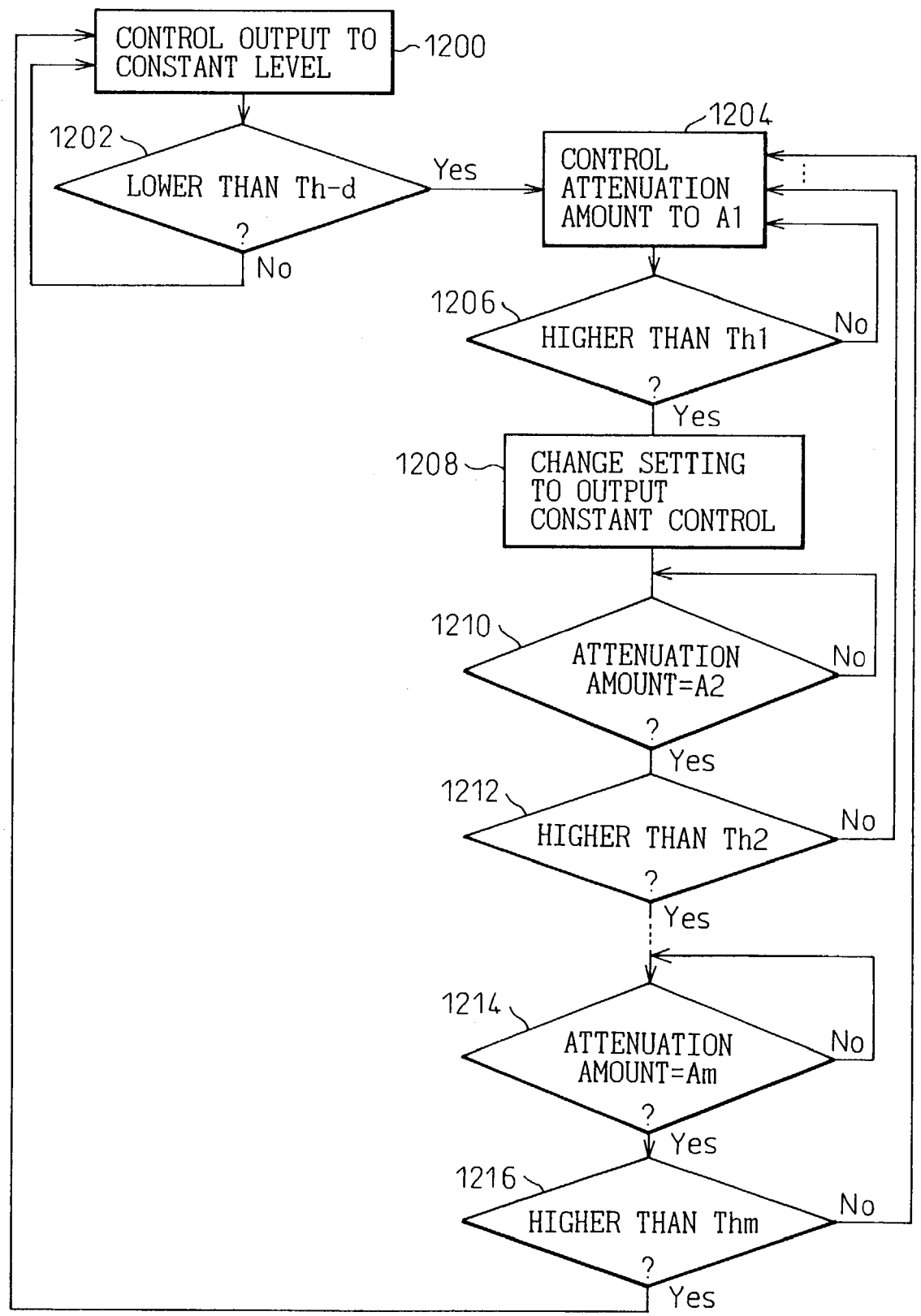
FIG. 12 is a flowchart showing the third example of control.

Generally, the response of a variable optical attenuator is relatively slow; therefore, when the amount of attenuation is changed from A1 used in the signal off condition to the amount of attenuation used in the output constant control, the actual amount of attenuation does not change instantly, but changes relatively slowly, as shown in FIG. 11. In view of this, in the third example, a plurality of threshold values Th1, Th2, . . . , Thm are set for the detection of signal restoration (FIG. 10), and attenuation amounts A1, A2, . . . , Am are prestored in association with the respective threshold values. FIG. 12 is a flowchart showing the third example of the control performed in the control circuit 30. In FIG. 12, steps 1200, 1202, 1204, and 1206 are the same as the corresponding steps 1100, 1102, 1104, and 1106 in FIG. 7. When it is detected in step 1206 that the output power is larger than Th1, the attenuation amount setting in the variable optical attenuator is changed to the attenuation amount setting for the output constant control (step 1208). The amount of attenuation in the variable optical attenuator then decreases and, when the actual amount of attenuation drops to A2 in step 1210, it is determined whether the output power level exceeds the threshold value Th2 prestored in association with A2 (step 1212). If the output power level is not higher than Th2, the process returns to the attenuation amount constant control in step 1204. If the output power level is higher than Th2, then when the amount of attenuation drops to the next attenuation amount Am (m=3, 4, . . . ) (step 1214) a determination is made against the threshold value Thm (step 1216); if the output power level is not higher than Thm, the process returns to the attenuation amount constant control in step 1204. In this way, the output power level is checked against the threshold values Th2, Th3, . . . , Thm in sequence, and if it is determined that the output power is higher than any threshold value, the process finally returns to the output constant control in step 1200. In this example, instead of storing A2, A3, . . . , differences ΔB1, ΔB2, . . . , relative to A1 may be stored.

As the response of the variable optical attenuator is relatively slow, as earlier noted, when the signal is restored from the signal off condition, the output power rises relatively slowly after the control is switched to the output constant control, as shown in FIGS. 8 and 10. Accordingly, by checking the output power a plurality of times using the threshold values Th1, Th2, . . . , Thm set to match the slow response, erroneous detection can be prevented even though low threshold values are used.

Figure 13:
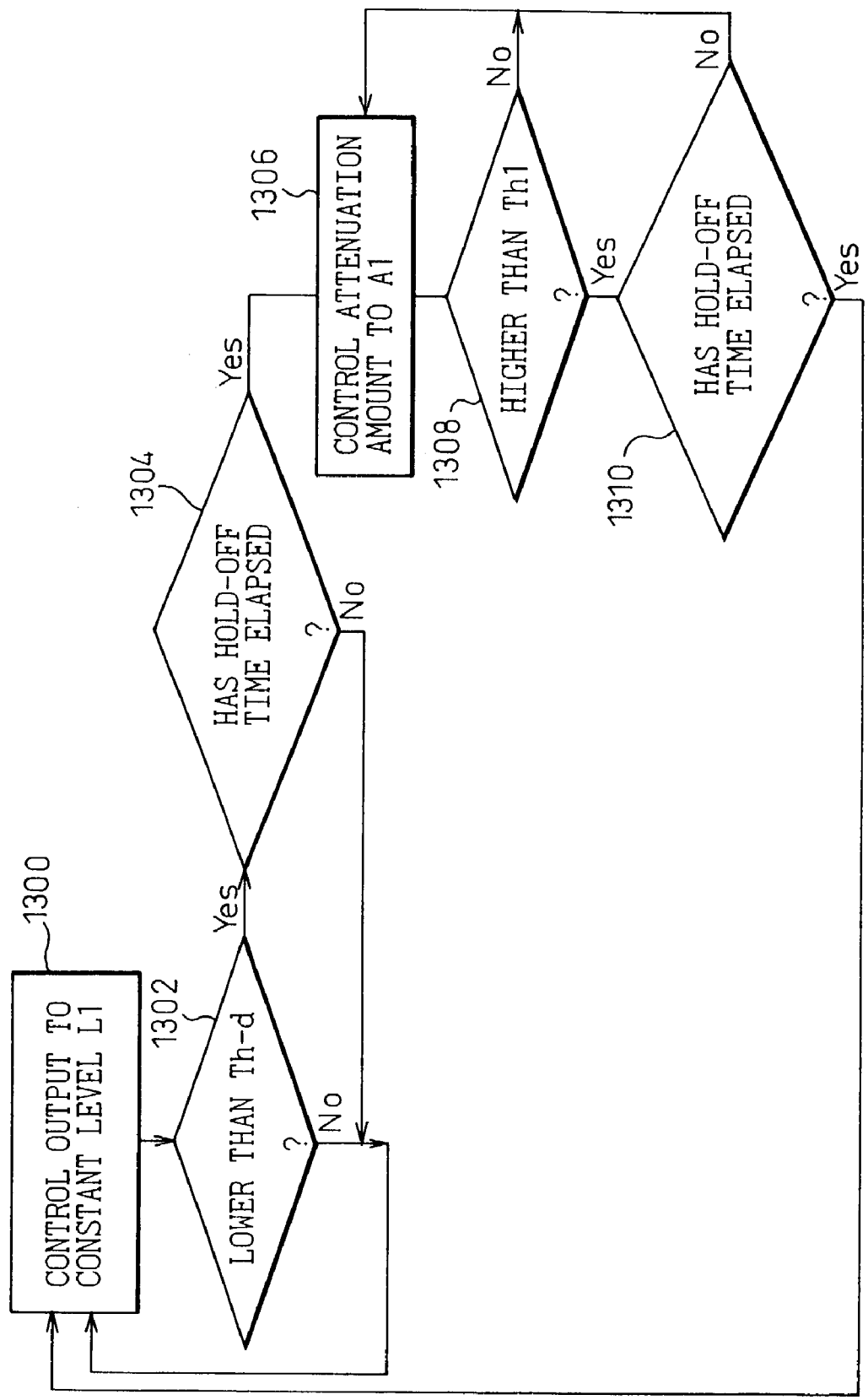
FIG. 13 is a flowchart showing a fourth example of control.

FIG. 13 is a flowchart showing a fourth example of the control performed in the control circuit 30. In FIG. 13, when the output constant control is being performed (step 1300), if the output level drops below the first threshold value Th-d (step 1302), the output constant control continues to be performed until a predetermined hold-off time elapses (step 1304); if the output level is restored to a level higher than Th-d within that predetermined time, the process returns to the output constant control. If the output level continues to stay below Th-d until the hold-off time has elapsed, the process proceeds to the attenuation amount constant control (step 1306). When the attenuation amount constant control is being performed, if it is detected that the output level is higher than the second threshold value Th1 (step 1308), the process returns to the output constant control (step 1300) only when the output level continues to remain higher than Th1 until the hold-off time has elapsed.

In the fourth example, when an output level lower than the threshold value Th-d is detected during the target value control, or when an output level higher than the threshold value Th1 is detected during the attenuation amount constant control, switching to the other control is not done immediately, but the control is switched to the attenuation amount constant control or the target value control, respectively, only when the detected condition continues to last until the hold-off time has elapsed. This serves to prevent an erroneous operation due to an instantaneous change in the output level.

Figure 14:
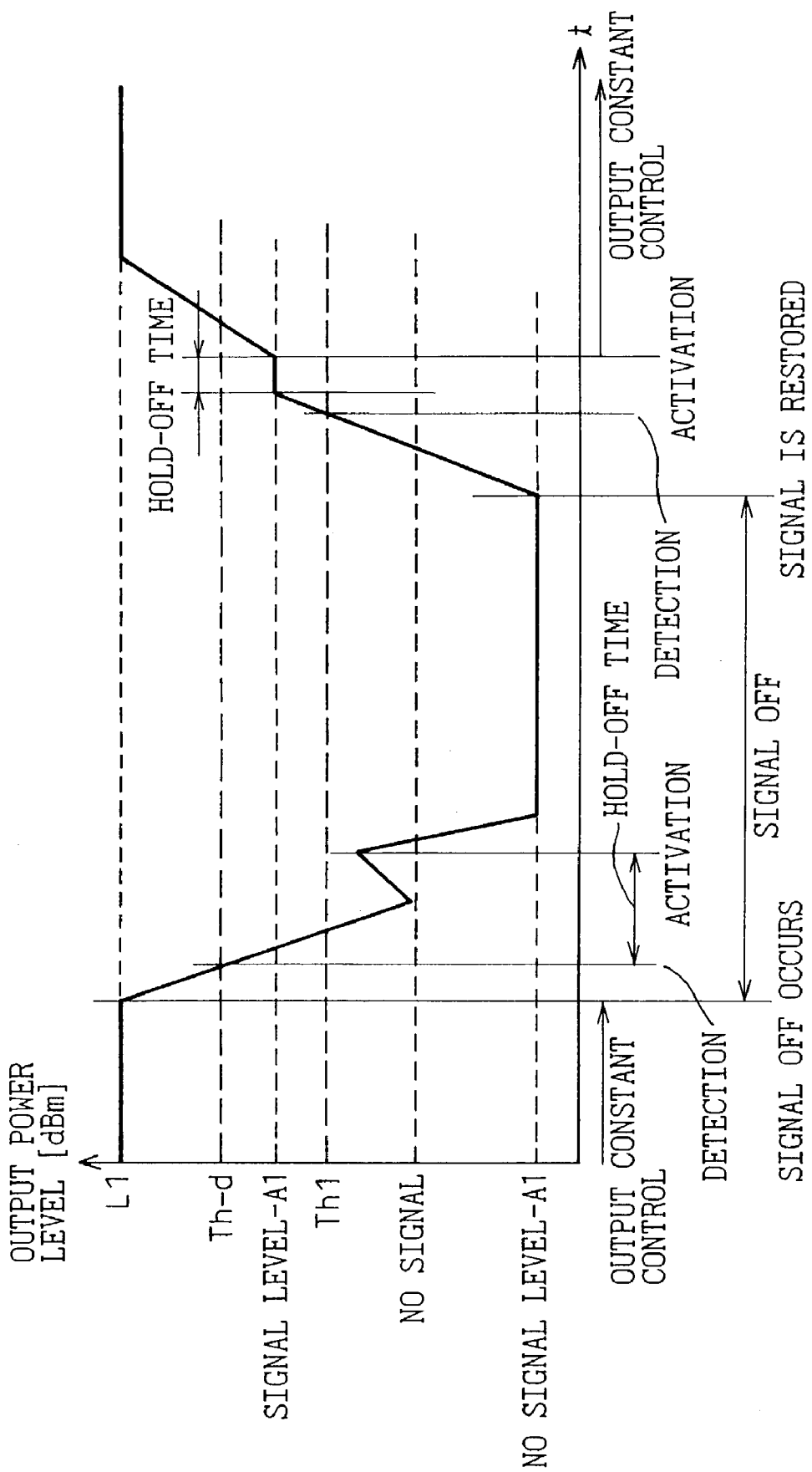
FIG. 14 is a diagram showing transitions of output power level in the fourth example of control.
Figure 15:
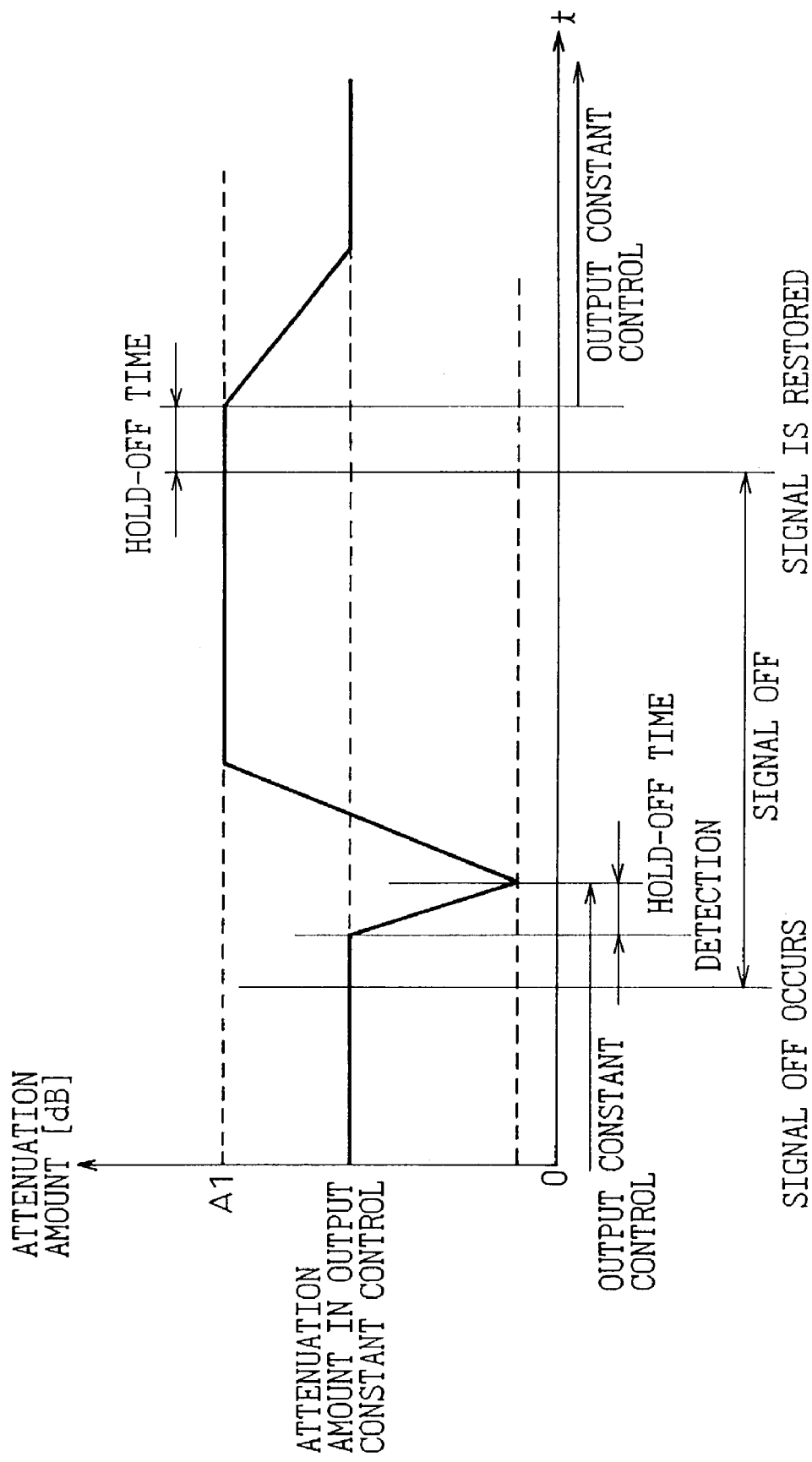
FIG. 15 is a diagram showing transitions of attenuation amount in the fourth example of control.

FIGS. 14 and 15 show the transitions of the output power level and the attenuation amount, respectively, in the fourth example of the control. As can be seen from FIGS. 14 and 15, as the output constant control continues to be performed during the hold-off period before switching from the output constant control to the attenuation amount constant control due to a signal off condition, the amount of attenuation is brought to zero, so that the output power level temporarily rises. At this time, if the optical power level happens to be restored, then if the power level is restored to the same level as the level before the instantaneous off condition, the output level becomes higher than the level before the instantaneous off condition. To prevent this, when the output level drops below Th-d, and switching is made from the output constant control to the attenuation amount constant control, the value of the attenuation amount immediately before the output level drops below Th-d should be retained, and the attenuation amount should be set to the predetermined attenuation amount A1 when the output level is lower than Th-d even after the hold-off time has elapsed.

Likewise, when an output level higher than Th1 is detected during the signal off condition, the target value control may be resumed immediately, and if the output level is lower than Th1 after the hold-off time has elapsed, the control may be switched back to the attenuation amount constant control.

Figure 16:
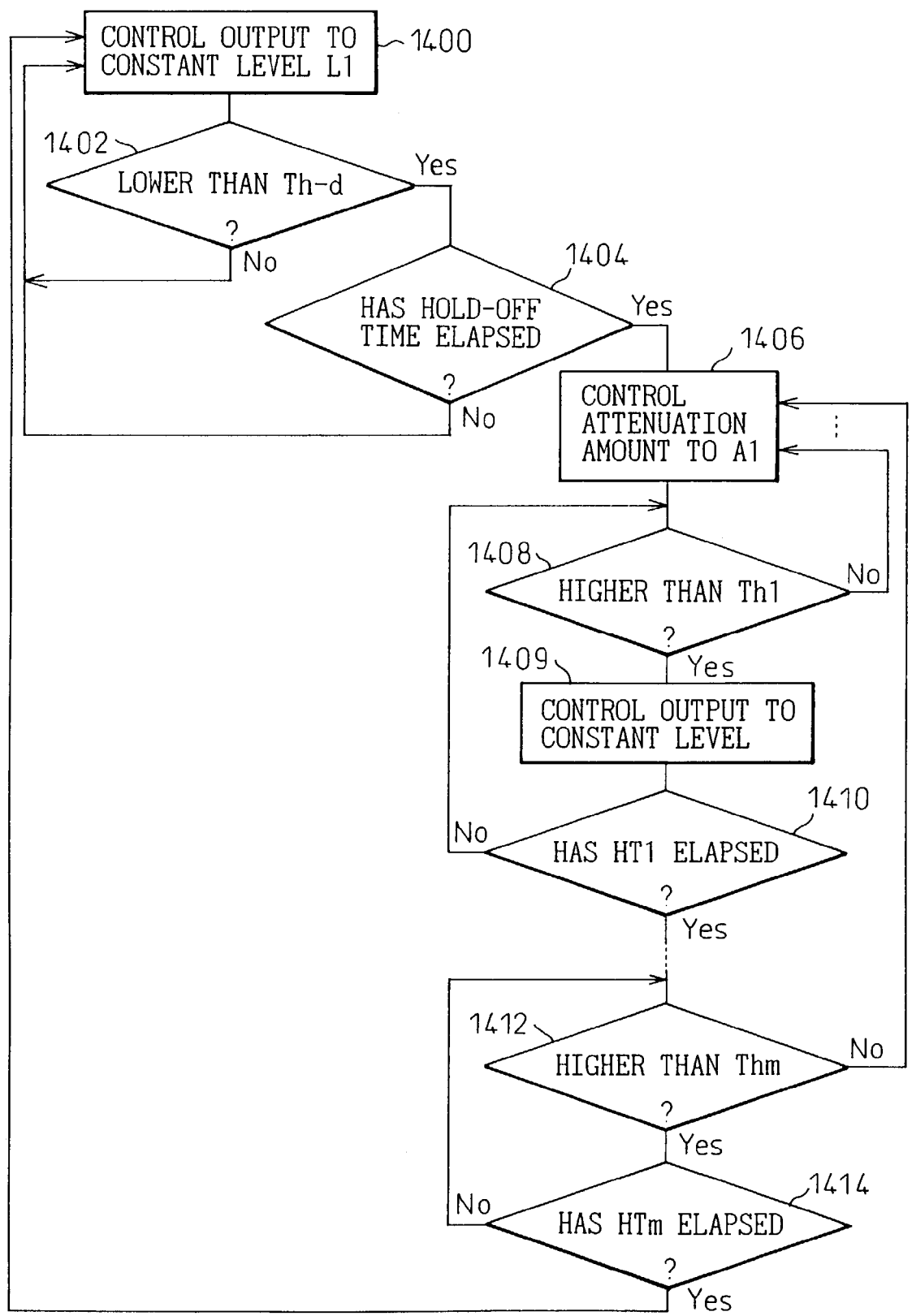
FIG. 16 is a flowchart showing a fifth example of control.

FIG. 16 is a flowchart showing a fifth example of the control performed in the control circuit 30. In this example, a plurality of hold-off times HTm (m=1, 2, . . . ) are set in association of a plurality of threshold values Thm. In FIG. 16, steps 1400, 1402, and 1404 are the same as the corresponding steps 1300, 1302, and 1304 in FIG. 13. As described earlier, when it is detected that the output power is lower than Th-d, provisions may be made to retain the amount of attenuation at that instant in time. When the attenuation amount constant control is being performed (step 1406), if it is detected that the output power is higher than Th1 (step 1408), the process proceeds to the output constant control (step 1409). If the output level drops below Th1 before the hold-off time HT1 associated with Th1 expires, the process returns to the attenuation amount constant control (step 1406). If the output level continues to stay above Th1 until the hold-off time HT1 has elapsed, then the output level is checked against the next threshold value Thm (m=2, 3, . . . ) for the hold-off time HTm (steps 1412 and 1414). When the processing is completed for all the threshold values, the process returns to the output constant control in step 1400.

Figure 17:
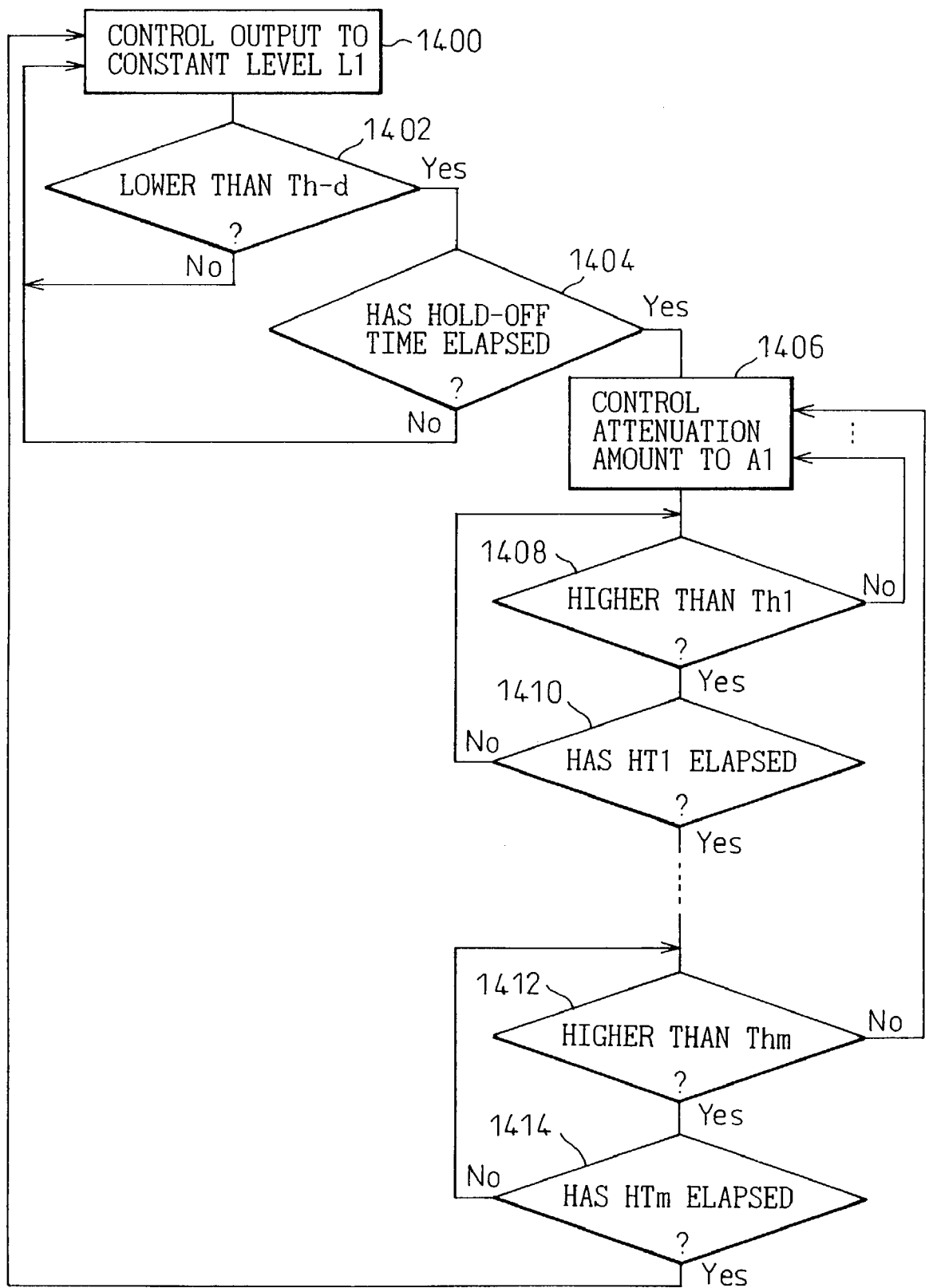
FIG. 17 is a flowchart showing one modification of the fifth example.

Alternatively, as shown in FIG. 17, when it is detected during the attenuation amount constant control that the output power is higher than the threshold value Th1, provision may be made not to switch the control to the output constant control until after the processing for all the threshold values is completed.

It is desirable that an upper limit value LOC1 and a lower limit value LOC2 be set for the target value L1 in the output constant control, and that an alarm be output to notify the apparatus or the administrator in the event that the output power level exceeds the upper limit value LOC1 or drops below the lower limit value LOC2 during the output constant control. When the output power level has dropped below the lower limit value LOC2, the alarm may be output only when the output level is higher than a signal off detection threshold value Th0 or Th-d that is set lower than the lower limit value LOC2.

Further, when the output power has exceeded the upper limit value LOC1 or has dropped below LOC2 but is higher than the threshold value Th0 or Th-d during the output constant control, the output may be shut down by setting the amount of attenuation in the variable optical attenuator to its maximum value.

It is desirable that the threshold value Th1 for detecting the restoration from the signal off condition be set as close as possible to the output level at the time of signal restoration in order to enhance the sensitivity of the detection. To achieve this, the attenuation amount A1 in the signal off condition must be made stable. For this purpose, data defining the relationship between the attenuation amount and a variation factor such as temperature variation that can cause variation in the attenuation amount is prestored, and monitoring is performed periodically or constantly for the occurrence of a variation or any change in the variation factor from the initial setting of A1; if there occurs a change in the variation factor, a correction value is derived from the prestored data and the amount of attenuation in the variable optical attenuator is controlled so that the amount of attenuation is brought back to A1. In this way, the amount of attenuation can be always set or maintained at A1.

Figure 18:
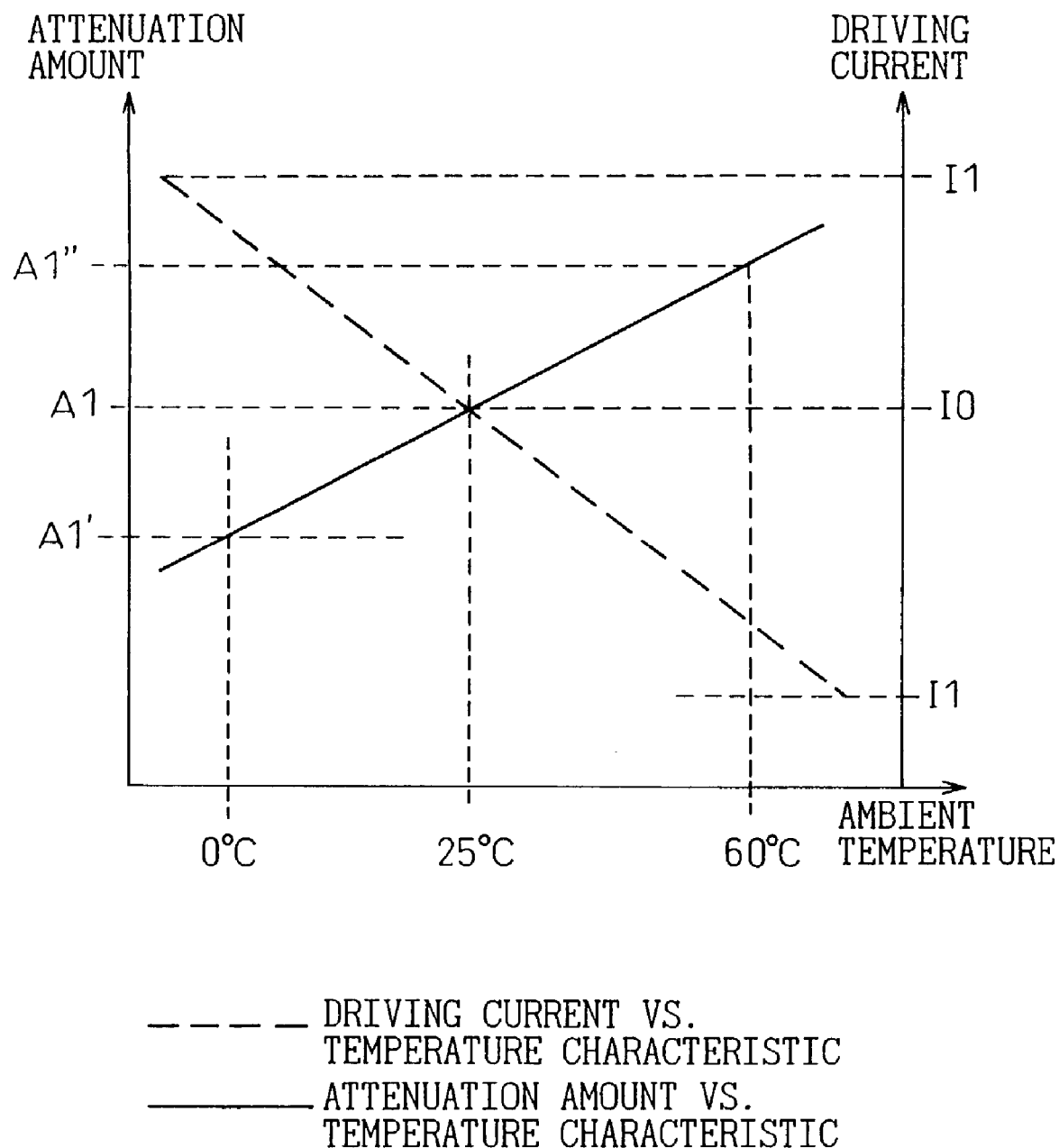
FIG. 18 is a diagram showing the relationship between attenuation amount versus temperature characteristic and driving current versus temperature characteristic for maintaining the attenuation amount constant.

For example, even when the driving current of the variable optical attenuator is constant, if the temperature changes, the attenuation value also changes as shown by a solid line in FIG. 18. In view of this, the characteristic such as shown by a dashed line in FIG. 18 is prestored, and the driving current is changed in accordance with the change of the temperature to maintain the attenuation amount constant.

In the control method described so far, it is desirable that, when the signal restoration is detected, the determination by the threshold value Th-d or Th0 be masked until after a predetermined time elapses from the time a full transition is made to the output constant control. It is also desirable that, when it is detected during the output constant control that the output level is lower than Th-d or Th0, it be determined that the output level is lower than Th-d or Th0 only when the lower level condition has been detected a plurality of times in succession.

Figure 19:
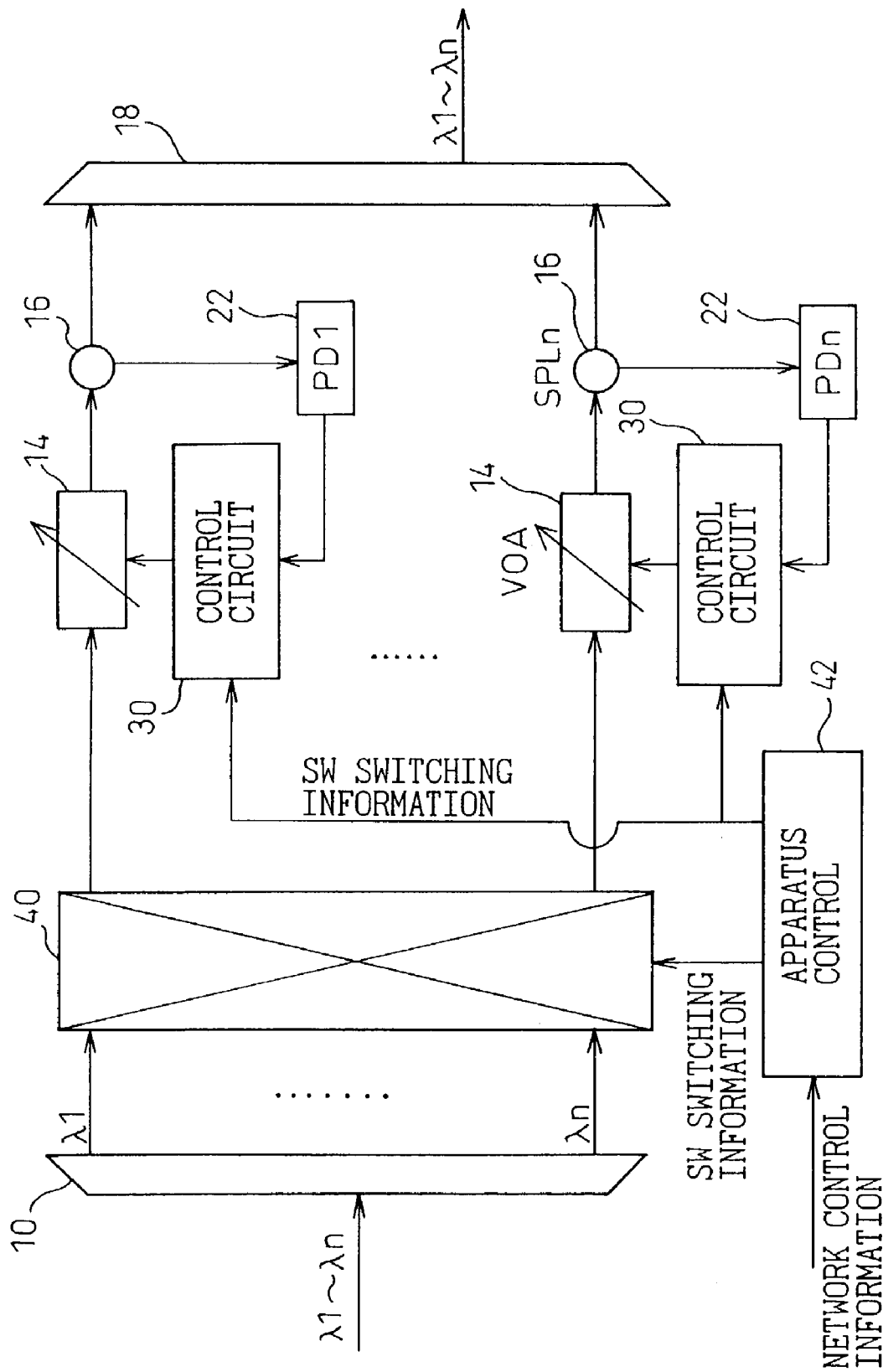
FIG. 19 is a diagram showing an example in which the present invention is applied to an optical ADM or an optical cross-connect.

FIG. 19 shows an example in which the present invention is applied to cope with level variations among channels or a fault condition in an optical ADM (OADM) or an optical cross-connect (OXC). A wavelength multiplexed signal is demultiplexed by an optical splitter 10 and input to an N×N optical switch 40. Each signal light whose path is switched by the optical switch is input to a variable optical attenuator 14 and fed via an optical branching device 16 into an optical combiner 18, where the signals are multiplexed again. The multiplexed signal is then amplified by an optical amplifier and transmitted out on a transmission line. It is shown here that the wavelength multiplexed signal from one path is demultiplexed and the demultiplexed signals are passed through the optical switch 40 and multiplexed again into one wavelength multiplexed signal, but actually, path switching is performed on wavelength multiplexed signals input from one or more paths, and the demultiplexed signals are combined into one or more wavelength multiplexed signals for transmission on one or more paths.

The level of the signal light input to each variable optical attenuator 14 differs from channel to channel because of components such as the optical switch; therefore, in the illustrated example, the output level is set to a uniform level before transmission to the next node. If the signal light level is not set to a uniform level, variation between channels increases, and the level may exceed the dynamic range of the receiver. Further, when there is no signal light due to a cut input fiber or the like, the amount of attenuation is set to zero in the output constant control. As a result, when the signal light is restored, the power level on any channel where the amount of attenuation is not to zero in the output constant control increases, causing a power surge; to prevent this, the amount of attenuation in VOA is automatically fixed to a certain predetermined value.

An apparatus control unit 42 changes the network configuration by switching the N×N optical switch 40 in accordance with network control information. Here, if the switch switching information is also input to each control circuit 30 so that the attenuation amount A1 in the signal off condition can be changed in accordance with use or nonuse of the corresponding channel, then even if the optical power at the time of signal restoration is small, the signal restoration can be reliably detected to switch the control to the output constant control.

Figure 20:
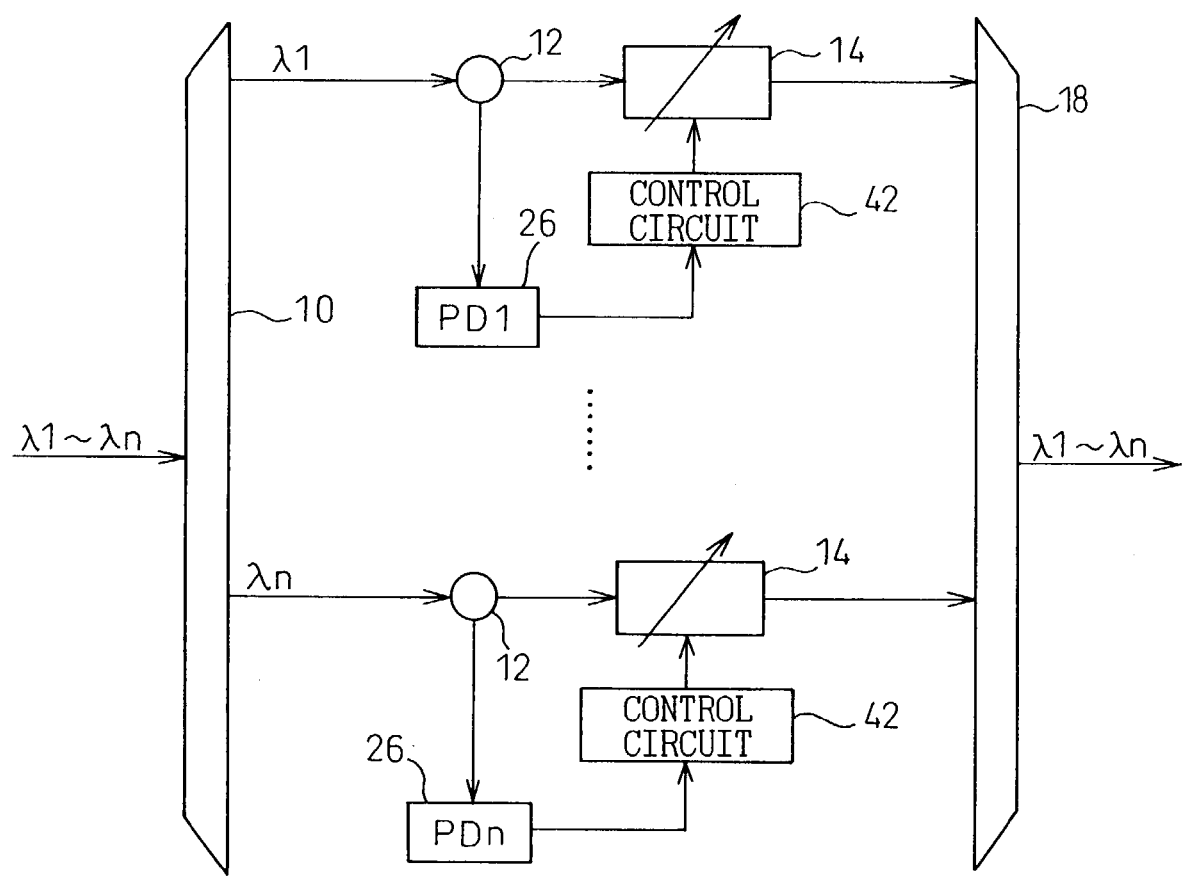
FIG. 20 is a diagram showing a second embodiment of the present invention.

FIG. 20 is a diagram showing a second embodiment of the present invention. The same constituent elements as those in FIGS. 1 and 2 are designated by the same reference numerals, and the description of those elements will be omitted.

In the embodiment of FIG. 20, each control circuit 42 achieves both the optical power level constant control and the detection and control of a signal off condition and restoration from the signal off condition, based only on the result of the detection supplied from the optical branching device 12 and the photodetector 26 provided on the input side of the variable optical attenuator 14.

Figure 21:
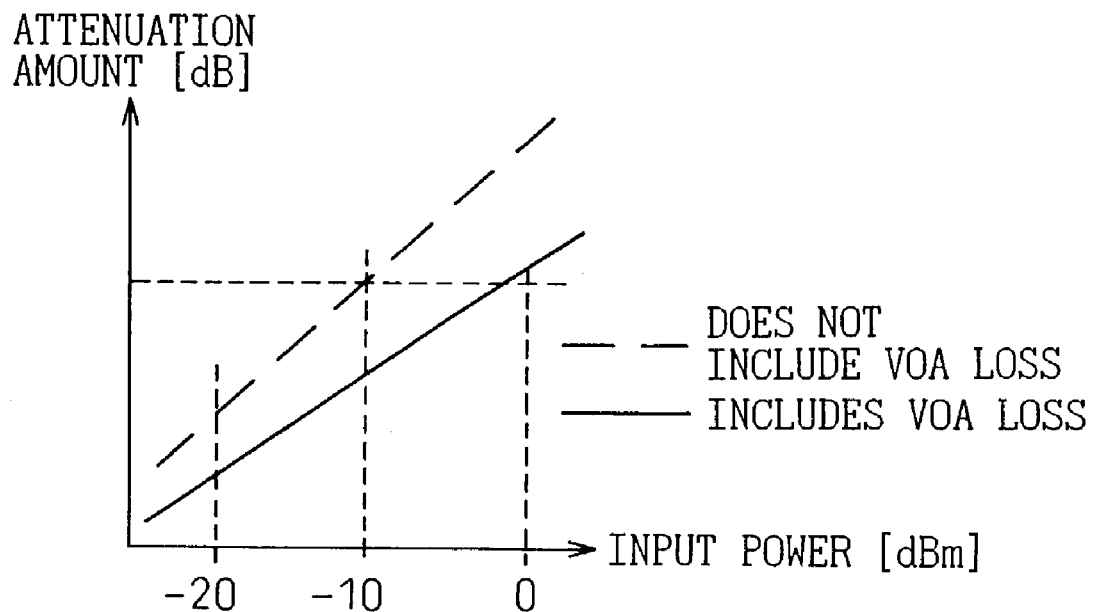
FIG. 21 is a diagram showing the relationship between input power level and attenuation amount for controlling the output power level to a predetermined value L1.
Figure 22:
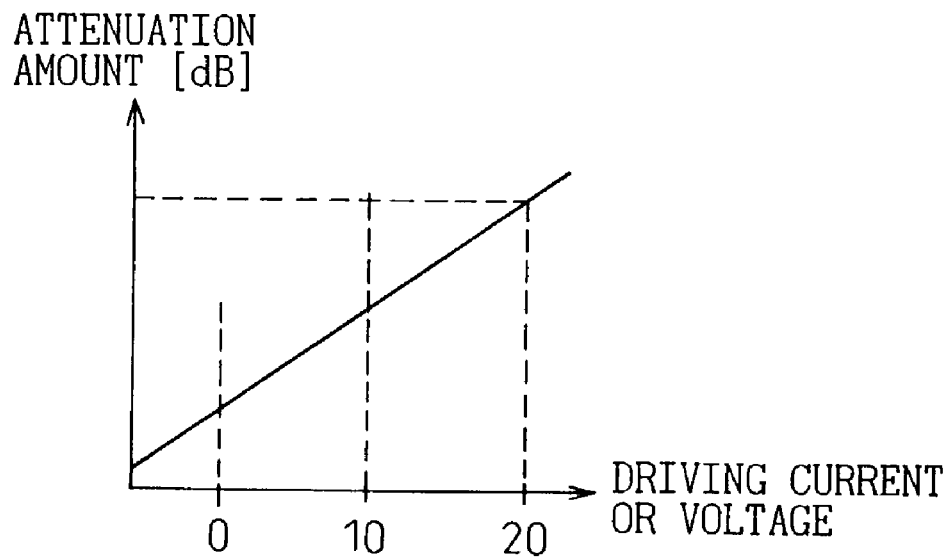
FIG. 22 is a diagram showing the relationship between attenuation amount and driving current or voltage.

If the signal power level detected by the photodetector 26 is lower than the threshold value Th0, the amount of attenuation in the variable optical attenuator 14 is set to maximum (or to a certain predetermined value), and when the power level is restored to a level higher than the threshold value Th0, the output of the variable optical attenuator 14 is controlled to the constant value L1. FIG. 21 shows the relationship between the input power level to the variable optical attenuator 14 and the attenuation amount for controlling the output power level to the predetermined value L1, and FIG. 22 shows the relationship between the attenuation amount and the driving current or voltage of the variable optical attenuator; the relationship between the input power and the driving current or voltage for controlling the output power to the predetermined value L1 is determined from the above relationships and is stored in advance. In the optical output constant control, based on these relationships, the driving current or voltage for controlling the output power level to the predetermined value is determined from the input power level and supplied to the variable optical attenuator 14.

As in the first embodiment which performs control based on the level on the output side of the variable optical attenuator, modifications can also be made in the second embodiment; for example, the signal off detection threshold value Th-d and the signal restoration detection threshold value Th1 may be set to respectively different values, a hold-off time may be provided based on which to switch from one control mode to the other, and an alarm may be issued and/or the power may be shut down when the power level exceed the upper limit value or drops below the lower limit value.

The invention claimed is:

1. A method of controlling an optical signal level of a variable optical attenuator having an optical input and an optical output, comprising the steps of:
   (a) detecting optical power level at the optical output of the variable optical attenuator;
   (b) controlling an amount of attenuation in said variable optical attenuator so that said detected optical power level becomes equal to a target value;
   (c) detecting a signal off condition when said detected optical power level has dropped from said target value to below a first threshold value; and
   (d) maintaining the amount of attenuation in said variable optical attenuator at a constant, predetermined value when the signal off condition is detected, wherein said predetermined value being chosen to be small enough so that the step (a) is able to detect said optical power level when said optical power level is restored from the signal off condition.

2. The method according to claim 1, further comprising a step (e) of resuming the target value control of step (b) when said detected optical power level is restored to a level higher than said first threshold value during the step (d) of maintaining the amount of attenuation in said variable optical attenuator at said predetermined value.

3. The method according to claim 1, further comprising a step (e) of resuming the target value control of step (b) when said detected optical power level is restored to a level higher than a second threshold value lower than said first threshold value during the step (d) of maintaining the amount of attenuation in said variable optical attenuator at said predetermined value.

4. The method according to claim 3, wherein a plurality of threshold values and a plurality of attenuation amounts respectively associated with said threshold values are stored in advance, and wherein said resuming comprises:
   changing a set value for the amount of attenuation in said variable optical attenuator to the value for the target value control of step (b) when said detected optical power level has exceeded the lowest one of said plurality of threshold values;
   switching the control of said variable optical attenuator back to the control of step (d) when, after substep (i), an actual amount of attenuation in said variable optical attenuator has reached one of said plurality of attenuation amounts but said optical power level detected at this time is not higher than the threshold value stored in associated with said reached attenuation amount; and fully switching the control of said variable optical attenuator to the target value control of step (b) by determining that said optical power level is restored to the level higher than said second threshold value if said optical power level in substep (ii) has exceeded the threshold values for all of the stored attenuation values.

5. The method according to claim 3, wherein in step (e), the target value control of step (b) is resumed only when said optical power level detected as higher than said second threshold value continues to remain higher until a predetermined hold-off time has elapsed.

6. The method according to claim 3, wherein, in step (e), after switching the control of said variable optical attenuator to said target value control by detecting said optical power level higher than said second threshold value, if said optical power level is detected as being lower than said second threshold value when a predetermined hold-off time has elapsed, the control of said variable optical attenuator is switched back to the control of step (d).

7. The method according to claim 3, wherein a plurality of threshold values and a plurality of hold-off times respectively associated with said threshold values are stored in advance, and wherein said step (e) includes the substeps of:

(i) changing a set value for the amount of attenuation in said variable optical attenuator to the value for the target value control of step (b) when said detected optical power level has exceeded the lowest one of said plurality of threshold values;

(ii) switching the control of said variable optical attenuator back to the control of step (d) if said optical power level, after being detected as having exceeded one of said plurality of threshold values, is detected as being not higher than said exceeded threshold value when the hold-off time stored in association with said threshold value has elapsed; and (iii) fully switching the control of said variable optical attenuator to the target value control of step (b) by determining that said optical power level is restored to the level higher than said second threshold value if said optical power level detected in substep (ii) has exceeded the threshold values for all of the stored hold-off times.

8. The method according to claim 3, wherein a plurality of threshold values and a plurality of hold-off times respectively associated with said threshold values are stored in advance, and wherein said step (e) includes the substeps of:

(i) switching the control of said variable optical attenuator back to the control of step (d) if said optical power level, after being detected as having exceeded one of said plurality of threshold values, is detected as being not higher than said exceeded threshold value when the hold-off time stored in association with said threshold value has elapsed; and (ii) switching the control of said variable optical attenuator to the target value control of step (b) by determining that said optical power level is restored to the level higher than said second threshold value if said optical power level detected in substep (ii) has exceeded the threshold values for all of the stored hold-off times.

9. The method according to claim 1, wherein, in step (d) when said detected optical power level has dropped below said first threshold value, the amount of attenuation in said variable optical attenuator is maintained at the value yielded at that instant in time, and only when said optical power level continues to remain lower than said first threshold value until a predetermined hold-off time has elapsed, the amount of attenuation in said variable optical attenuator is maintained at said predetermined value.

10. The method according to claim 1, further comprising the step (e) of issuing an alarm when said detected optical power level exceeds an upper limit value or drops below a lower limit value during the target value control of step (b).

11. The method according to claim 1, further comprising the step (e) of setting the amount of attenuation in said variable optical attenuator to a maximum value if said detected optical power level exceeds an upper limit value or drops to a level between said first threshold value and a lower limit value during the target value control of step (b).

12. The method according to claim 1, further comprising the step (e) of correcting the amount of attenuation in accordance with a factor affecting the amount of attenuation if the occurrence of said factor is detected during the control of step (d).

13. The method according to claim 2, wherein determination by said first threshold value in step (d) is masked until a predetermined time elapses after the resumption of said target value control.

14. The method according to claim 1, wherein said predetermined value at which the amount of attenuation in said variable optical attenuator is to be maintained in step (d) is changed in accordance with use or nonuse of an optical signal channel including said variable optical attenuator.

15. A method of controlling an optical signal level of a variable optical attenuator having an optical input and an optical output, comprising the steps of:

(a) prestoring a relationship between optical power level at an optical input of a variable optical attenuator and a setting for said variable optical attenuator for bringing the optical power level at an optical output of said variable optical attenuator to a target value;

(b) detecting the optical power level at the optical input of said variable optical attenuator;

(c) controlling the optical power level at the optical output of said variable optical attenuator to said target value by setting the amount of attenuation in said variable optical attenuator based on said detected optical power level and said prestored relationship; and (d) maintaining the amount of attenuation in said variable optical attenuator at a constant, predetermined value when said detected optical power level has dropped from said target value to below a first threshold value.

16. The method according to claim 15, further comprising the step of (e) resuming the control of step (c) when said detected optical power level is restored to a level higher than said first threshold value during the step of maintaining the amount of attenuation in said variable optical attenuator at said predetermined value.

17. The method according to claim 15, further comprising the step of (e) resuming the control of step (c) when said detected optical power level is restored to a level higher than a second threshold value different from said first threshold value during the step of maintaining the amount of attenuation in said variable optical attenuator at said predetermined value.

18. The method according to claim 17, wherein, in step (e), the target value control of step (c) is resumed only when said optical power level detected as higher than said second threshold value continues to remain higher until a predetermined hold-off time has elapsed.

19. The method according to claim 15, further comprising the step (f) of issuing an alarm when said detected optical power level exceeds an upper limit value or drops below a lower limit value during the target value control of step (c).

20. The method according to claim 15, further comprising the step (f) of setting the amount of attenuation in said variable optical attenuator to a maximum value if said detected optical power level exceeds an upper limit value or drops below a lower limit value during the target value control of step (c).

21. The method according to claim 15, wherein determination by said first threshold value in step (d) is masked until a predetermined time elapses after the resumption of said target value control.

22. A method according to claim 15, wherein, in step (d), when said detected optical power level has dropped below said first threshold value, the amount of attenuation in said variable optical attenuator is maintained at the value yielded at that instant in time, and only when said optical power level continues to remain lower than said first threshold value until a predetermined hold-off time has elapsed, the amount of attenuation in said variable optical attenuator is maintained at said predetermined value.

23. An optical signal level control apparatus, comprising:
a variable optical attenuator having an optical input and an optical output;
a photodetector detecting optical power level at the optical output of said variable optical attenuator; and
a control circuit controlling an amount of attenuation in said variable optical attenuator in accordance with said detected optical power level, wherein said control circuit includes:
means for controlling the amount of attenuation in said variable optical attenuator so that said detected optical power level becomes equal to a target value,
means for detecting a signal off condition when said detected optical power level has dropped from said target value to below a first threshold value; and
means for maintaining the amount of attenuation in said variable optical attenuator at a constant, predetermined value when the signal off condition is detected, wherein said predetermined value being chosen to be small enough so that said photodetector is able to detect said optical power level at the optical output of said variable optical attenuator when said optical power level is restored from the signal off condition.

24. The apparatus according to claim 23, wherein said control circuit further includes means for resuming said target value control when said detected optical power level is restored to a level higher than said first threshold value while maintaining the amount of attenuation in said variable optical attenuator at said predetermined value.

25. The apparatus according to claim 23, wherein said control circuit further includes means for resuming said target value control when said detected optical power level is restored to a level higher than a second threshold value lower than said first threshold value while maintaining the amount of attenuation in said variable optical attenuator at said predetermined value.

26. The apparatus according to claim 25, wherein said control circuit further includes means for storing a plurality of threshold values and a plurality of attenuation amounts respectively associated with said threshold values, and wherein said resuming means includes:
means for changing a set value for the amount of attenuation in said variable optical attenuator to the value for said target value control when said detected optical power level has exceeded the lowest one of said plurality of threshold values;
means for switching the control of said variable optical attenuator back to said prescribed value maintaining control when an actual amount of attenuation in said variable optical attenuator has thereafter reached one of said plurality of attenuation amounts but said optical power level detected at this time is not higher than the threshold value stored in associated with said reached attenuation amount; and
means for fully switching the control of said variable optical attenuator to said target value control by determining that said optical power level is restored to the level higher than said second threshold value if said optical power level has exceeded the threshold values for all of the stored attenuation values.

27. The apparatus according to claim 25, wherein said target value control resuming means resumes said target value control only when said optical power level detected as higher than said second threshold value continues to remain higher until a predetermined hold-off time has elapsed.

28. The apparatus according to claim 25, wherein, after switching the control of said variable optical attenuator to said target value control by detecting said optical power level higher than said second threshold value, if said optical power level is detected as being lower than said second threshold value when a predetermined hold-off time has elapsed, said target value control resuming means switches the control of said variable optical attenuator back to said predetermined value maintaining control.

29. The apparatus according to claim 25, wherein said control circuit further includes means for storing a plurality of threshold values and a plurality of hold-off times respectively associated with said threshold values, and wherein said resuming means includes:
means for changing a set value for the amount of attenuation in said variable optical attenuator to the value for said target value control when said detected optical power level has exceeded the lowest one of said plurality of threshold values;
means for switching the control of said variable optical attenuator back to said predetermined value maintaining control if said optical power level, after being detected as having exceeded one of said plurality of threshold values, is detected as being not higher than said exceeded threshold value when the hold-off time stored in association with said threshold value has elapsed; and
means for fully switching the control of said variable optical attenuator to said target value control by determining that said optical power level is restored to the level higher than said second threshold value if said detected optical power level has exceeded the threshold values for all of the stored hold-off times.

30. The apparatus according to claim 25, wherein said control circuit further includes means for storing a plurality of threshold values and a plurality of hold-off times respectively associated with said threshold values, and wherein said resuming means includes:
means for switching the control of said variable optical attenuator back to said predetermined value maintaining control if said optical power level, after being detected as having exceeded one of said plurality of threshold values, is detected as being not higher than said exceeded threshold value when the hold-off time stored in association with said threshold value has elapsed; and means for switching the control of said variable optical attenuator to said target value control by determining that said optical power level is restored to the level higher than said second threshold value if said detected optical power level has exceeded the threshold values for all of the stored hold-off times.

31. The apparatus according to claim 23, wherein, when said detected optical power level has dropped below said first threshold value, said predetermined value maintaining means maintains the amount of attenuation in said variable optical attenuator at the value yielded at that instant in time, and only when said optical power level continues to remain lower than said first threshold value until a predetermined hold-off time has elapsed, said predetermined value maintaining means maintains the amount of attenuation in said variable optical attenuator at said predetermined value.

32. The apparatus according to claim 23, wherein said control circuit further includes means for issuing an alarm when said detected optical power level exceeds an upper limit value or drops below a lower limit value during said target value control.

33. The apparatus according to claim 23, wherein said control circuit further includes means for setting the amount of attenuation in said variable optical attenuator to a maximum value if said detected optical power level exceeds an upper limit value or drops to a level between said first threshold value and a lower limit value during said target value control.

34. The apparatus according to claim 23, wherein said control circuit further includes means for correcting the amount of attenuation in accordance with a factor affecting the amount of attenuation if the occurrence of said factor is detected during said predetermined value maintaining control.

35. The apparatus according to claim 24, wherein determination by said first threshold value in said predetermined value maintaining means is masked until a predetermined time elapses after the resumption of said target value control.

36. The apparatus according to claim 23, wherein said predetermined value in said predetermined value maintaining means is changed in accordance with use or nonuse of an optical signal channel including said variable optical attenuator.

37. The optical signal level control apparatus, comprising:
  a variable optical attenuator having an optical input and an optical output;
  a photodetector detecting optical power level at the optical input of said variable optical attenuator; and
  a control circuit controlling the amount of attenuation in said variable optical attenuator in accordance with said detected optical power level, wherein said control circuit comprises:
    means for storing a relationship between the optical power level at the optical input of said variable optical attenuator and a setting for said variable optical attenuator for bringing the optical power level at the optical output of said variable optical attenuator to a target value,
    means for controlling the optical power level at the optical output of said variable optical attenuator to said target value by setting the amount of attenuation in said variable optical attenuator based on said detected optical power level and said stored relationship and
    means for maintaining the amount of attenuation in said variable optical attenuator at a constant, predetermined value when said detected optical power level has dropped from said target value to below a first threshold value.

38. The apparatus according to claim 37, wherein said control circuit further includes means for resuming said target value control when said detected optical power level is restored to a level higher than said first threshold value during the process of maintaining the amount of attenuation in said variable optical attenuator at said predetermined value.

39. The apparatus according to claim 37, wherein said control circuit further includes means for resuming said target value control when said detected optical power level is restored to a level higher than a second threshold value different from said first threshold value during the process of maintaining the amount of attenuation in said variable optical attenuator at said predetermined value.

40. The apparatus according to claim 39, wherein said target value control resuming means resumes said target value control only when said optical power level detected as higher than said second threshold value continues to remain higher until a predetermined hold-off time has elapsed.

41. The apparatus according to claim 37, wherein said control circuit further includes means for issuing an alarm when said detected optical power level exceeds an upper limit value or drops below a lower limit value during said target value control.

42. The apparatus according to claim 37, wherein said control circuit further includes means for setting the amount of attenuation in said variable optical attenuator to a maximum value if said detected optical power level exceeds an upper limit value or drops below a lower limit value during said target value control.

43. The apparatus according to claim 37, wherein determination by said first threshold value in said predetermined value maintaining means is masked until a predetermined time elapses after the resumption of said target value control.

44. The apparatus according to claim 37, wherein, when said detected optical power level has dropped below said first threshold value, said predetermined value maintaining means maintains the amount of attenuation in said variable optical attenuator at the value yielded at that instant in time, and only when said optical power level continues to remain lower than said first threshold value until a predetermined hold-off time has elapsed, said predetermined value maintaining means maintains the amount of attenuation in said variable optical attenuator at said predetermined value.

45. A method comprising:
  (a) detecting optical power level at an optical output of a variable optical attenuator attenuating an optical signal;
  (b) when the detected optical power level is above a first threshold value, controlling an amount of attenuation in said variable optical attenuator so that said detected optical power level becomes equal to a target value;
  (c) detecting a signal off condition when the detected optical power level has dropped from the target value to below the first threshold value; and
  (c) when the signal off condition is detected, maintaining the amount of attenuation in said variable optical attenuator at a constant, predetermined value, said predetermined value being small enough so that said detecting optical power level is able to detect the optical power level at the optical output of the variable optical attenuator when the optical power level is restored from the signal off condition.

46. An apparatus comprising:

means for detecting optical power level at an optical output of a variable optical attenuator attenuating an optical signal;

means, when the detected optical power level is above a first threshold value, for controlling an amount of attenuation in said variable optical attenuator so that said detected optical power level becomes equal to a target value;

means for detecting a signal off condition when the detected optical power level has dropped from the target value to below the first threshold value; and means, when the signal off condition is detected, for maintaining the amount of attenuation in said variable optical attenuator at a constant, predetermined value, said predetermined value being small enough so that said means for detecting is able to detect the optical power level when the optical power level is restored from the signal off condition.

47. A method of controlling an amount of attenuation of a variable optical attenuator having an optical input and an optical output and attenuating an optical signal, comprising:

(a) detecting optical power level at the optical output of the variable optical attenuator;

(b) controlling an amount of attenuation in said variable optical attenuator so that said detected optical power level becomes equal to a target value; and (c) maintaining the amount of attenuation in said variable optical attenuator at a constant, predetermined value when said detected optical power level has dropped, due to a signal off condition of the optical signal, from said target value to below a first threshold value, said predetermined value being chosen to be small enough so that said detecting is able to detect said optical power level when said optical power level is restored, due to restoration of the optical signal from the signal off condition, to a level higher than a level to which said optical power level dropped.

* * * * *

UNITED STATES PATENT AND TRADEMARK OFFICE
CERTIFICATE OF CORRECTION

PATENT NO. : 7,394,951 B2 Page 1 of 1
APPLICATION NO. : 10/436076
DATED : July 1, 2008
INVENTOR(S) : Takuji Maeda et al.

It is certified that error appears in the above-identified patent and that said Letters Patent is hereby corrected as shown below:

Column 9, Line 64, after "(d)" insert --,--.

Column 14, Line 60, change "(c)" to --(d)--.

Signed and Sealed this

Twenty-first Day of October, 2008

JON W. DUDAS
*Director of the United States Patent and Trademark Office*